United States Patent
New

(10) Patent No.: US 7,613,284 B2
(45) Date of Patent: Nov. 3, 2009

(54) SYSTEMS, METHODS AND APPARATUS FOR RECEIPT PRINTING AND INFORMATION DISPLAY IN A PERSONAL IDENTIFICATION NUMBER DELIVERY SYSTEM

(75) Inventor: Darren New, San Diego, CA (US)

(73) Assignee: EWI Holdings, Inc., Pleasanton, CA (US)

( * ) Notice: Subject to any disclaimer, the term of this patent is extended or adjusted under 35 U.S.C. 154(b) by 0 days.

(21) Appl. No.: 11/939,327

(22) Filed: Nov. 13, 2007

(65) Prior Publication Data

US 2008/0212752 A1 Sep. 4, 2008

Related U.S. Application Data

(63) Continuation of application No. 10/925,218, filed on Aug. 24, 2004, now abandoned.

(51) Int. Cl.
*H04M 11/00* (2006.01)
(52) U.S. Cl. ...................... 379/93.12; 705/16
(58) Field of Classification Search ............. 379/93.12, 379/91.01, 114.2; 705/16, 43
See application file for complete search history.

(56) References Cited

U.S. PATENT DOCUMENTS

| | | | |
|---|---|---|---|
| 6,526,130 B1 * | 2/2003 | Paschini | 379/93.12 |
| 2003/0020947 A1 * | 1/2003 | Brewster et al. | 358/1.15 |
| 2004/0095604 A1 * | 5/2004 | Meyerhofer | 358/1.18 |
| 2005/0114215 A1 * | 5/2005 | Tramontano et al. | 705/16 |

* cited by examiner

*Primary Examiner*—Stella L Woo
(74) *Attorney, Agent, or Firm*—Cooley Godward Kronish LLP

(57) ABSTRACT

Systems, methods, and apparatus for providing a personal identification number (PIN) in the form of a receipt displayed and/or printed by a client terminal are disclosed. A method includes storing, at the client terminal, receipt templates, received from a server, for plural prepaid services from a plurality of prepaid service providers. The method further includes receiving, at the client terminal, a request for a PIN associated with one or more of the plural prepaid services. Requested PINs and other information associated with one or more of the plural prepaid services is then displayed and/or printed, in accordance with one or more of the receipt templates associated with the plural prepaid services, upon the receipt and dispensed by the client terminal. Related systems and apparatus are also disclosed.

25 Claims, 27 Drawing Sheets

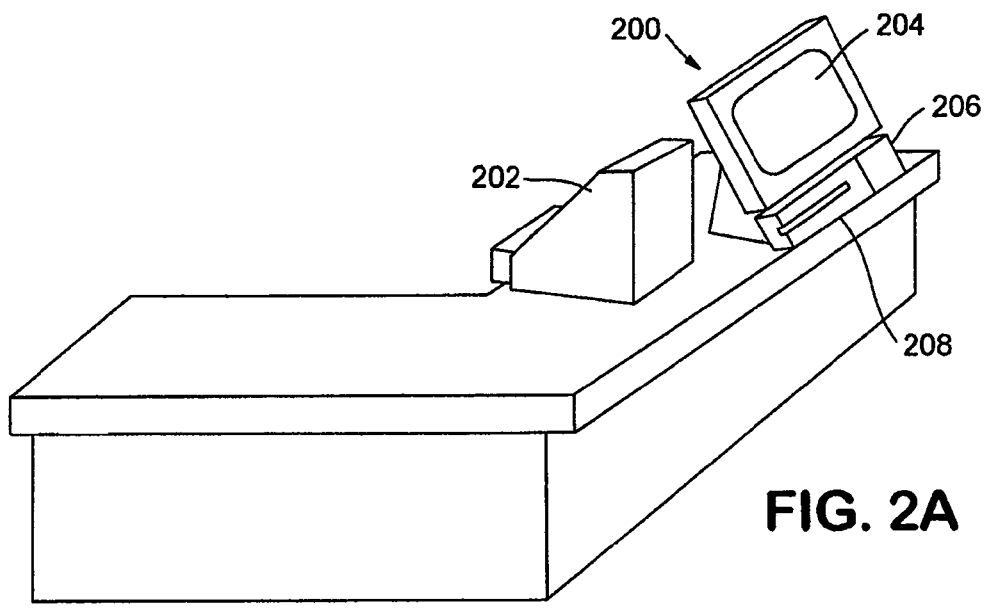
FIG. 2A
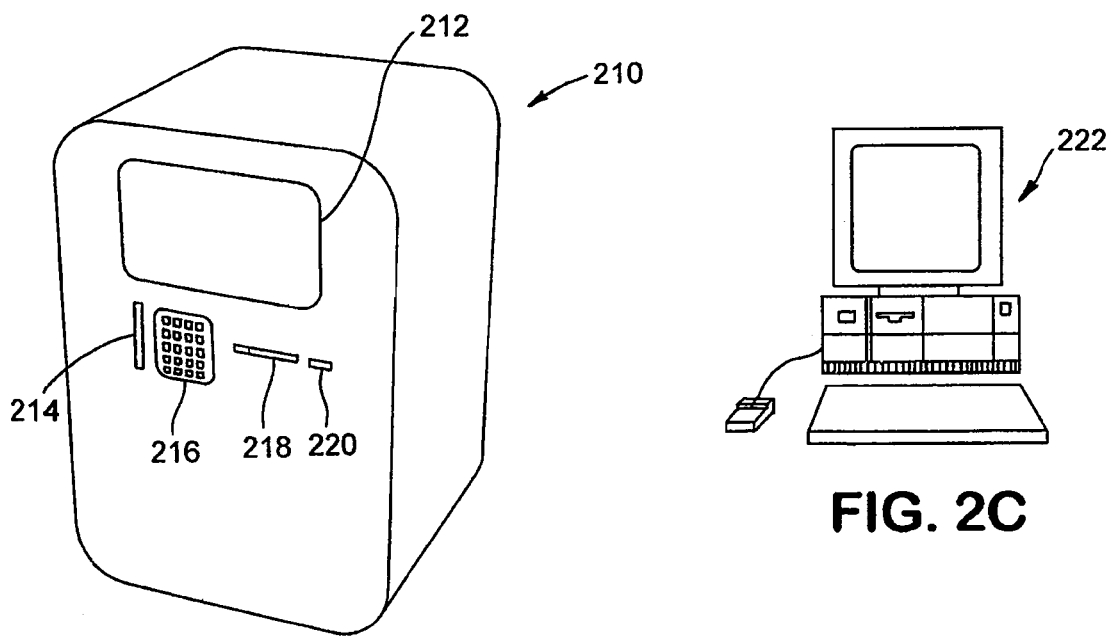
FIG. 2B
FIG. 2C

| PIN DATABASE 112 | | | | | |
|---|---|---|---|---|---|
| | 301<br>GOOD/SERVICE | 302<br>PROVIDER | 304<br>$ VALUE | 306<br>PIN | 308<br>RATE | 310<br>EXPIRATION |
| 312a | Cellular Service | AT&T | $15 | 3456234523 | $0.60/min | 1 month |
| 312b | Cellular Service | AT&T | $15 | 2830525950 | $0.60/min | 1 month |
| 312c | Cellular Service | AT&T | $15 | 9823459754 | $0.60/min | 1 month |
| 312d | Cellular Service | AT&T | $30 | 4575626584 | $0.50/min | 6 months |
| 312e | Cellular Service | AT&T | $30 | 2894754598 | $0.50/min | 6 months |
| | ... | ... | ... | ... | ... | ... |
| 312f | Cellular Service | AIRTOUCH | $50 | 0948574995 | $0.40/min | 1 year |
| 312g | Cellular Service | AIRTOUCH | $50 | 9087423543 | $0.40/min | 1 year |
| 312h | Cellular Service | AIRTOUCH | $50 | 1358909658 | $0.40/min | 1 year |
| 312i | Cellular Service | AIRTOUCH | $100 | 8759187405 | $0.35/min | 1 year |
| 312j | Cellular Service | AIRTOUCH | $100 | 8648767465 | $0.35/min | 1 year |
| 312k | Cellular Service | AIRTOUCH | $100 | 3245105748 | $0.35/min | 1 year |
| | ... | ... | ... | ... | ... | ... |
| 312l | Cellular Service | SPRINT | $25 | 8275098427 | $0.55/min | 6 months |
| 312m | Cellular Service | SPRINT | $25 | 0987451455 | $0.55/min | 6 months |
| 312n | Cellular Service | SPRINT | $50 | 1234870987 | $0.39/min | 6 months |
| 312o | Cellular Service | SPRINT | $50 | 8765230058 | $0.39/min | 6 months |
| 312p | Cellular Service | SPRINT | $100 | 4545454892 | $0.36/min | 6 months |
| | ... | ... | ... | ... | ... | ... |
| 312q | Gasoline | MOBIL | $100 | 1231283950 | Pump Rate | 1 year |
| 312r | Gasoline | MOBIL | $100 | 3458432349 | Pump Rate | 1 year |

FIG. 3

PrePaid Airtime Purchase Ordering System

© 2000 by Powered By Easy Wireless, Inc.
http://www.easywireless.com

Purchase Ordering Model

Purchase Order Data Entry

| Dealer Information: | Payment Method: | Current Balance: |
|---|---|---|
| ABC Communications<br>123 ABC St.,<br>San Diego, CA 91941 | Credit Card: Visa<br>Exp: 02/2002<br>Cardholder Name: John Doe | None |

| Carrier | Region | Card Type | Qty | Wholesale | Totals | Add/Del |
|---|---|---|---|---|---|---|
| Verizon Wireless | Northwest | $30 Card | 5 | $ 25.00 | $ 250.00 | |
| <Select Carrier> | <Select Region> | <Select Card> | 1 | $ --.-- | $ --.-- | |
| | | | | Grand Total: | $ 250.00 | |

Instructions

1) Select a Carrier, Region, Card Type then Enter a Quantity.
2) Confirm your line item by clicking "ADD" at the end of the line.
3) Repeat the process until all the PINs that you wish to purchase are listed.
4) Click "Continue To Summary Screen" to review your order and payment methods.

You *must* click ADD to buy a line item.

To Remove a Line Item: Click "DEL" on the line item you wish to remove.

To Change a Quantity: Change the quantity field to the desired amount, then click "Update Order".

To Cancel the Entire Order: Click "Cancel Order".

If you are having any problems with the system, please send an email to prepaidservice@easywireless.com with a brief description of your problem.

See Next Screen

FIG. 14

Purchase Order Summary

| Dealer Information: | Payment Method: | Current Balance: |
|---|---|---|
| ABC Communications<br>123 ABC St.<br>San Diego, CA 91941 | ACH Maxium:<br>$2,000<br>ACH Min Refresh:<br>$200 | $ 1,000 |

Account Response Window
Previous Balance: $ 1000.00
Amount of Purchase Order: $ 240.00
New Balance: $ 760.00

Purchase Order Summary:

Please review your Purchase Order. If satisfactory, "Submit PO" and your order will be processed and your account charged.

| # | Carrier | Region | Card Type | Qty | Card Cost | Totals |
|---|---|---|---|---|---|---|
| 1 | MCI | Region ABC | $ 5 Card | 5 | $ 3.00 | $ 15.00 |
| 2 | MCI | Region XYZ | $ 30 Card | 3 | $ 20.00 | $ 60.00 |
| 3 | AT&T Wireless | Los Angeles, CA | $ 50 Card | 1 | $ 35.00 | $ 35.00 |
| 4 | AT&T Wireless | Los Angeles, CA | $ 100 Card | 2 | $ 60.00 | $120.00 |
| 5 | Verizon | Louisville, KY | $ 5 Card | 5 | $ 2.00 | $ 10.00 |
|   |   |   |   |   | Grand Total: | $ 240.00 |

1502    1508    1504    1506

If you are having any problems with the system, please send an email to prepaidservice@easywireless.com with a brief description of your problem.

View Alternate Payment Page | View Print Screen

FIG. 15

Purchase Order Summary

Alternate Credit Card Payment Screen

Please Fill In All Fields. Billing Address must match CardHolder name.

Billing Information

Cardholder Name: ☐
Address Line 1: ☐
Address Line 2: ☐
City: ☐
State/Province: ☐
Zip Code: ☐
Credit Card Type: [MasterCard]
Expiration: Month [01] - Year [2000]
Credit Card Number: ☐

Purchase Order Summary:

Please review your Purchase Order. After you submit this order, the following screen will display your PINS and allow you to print them from your browser.

| # | Carrier | Region | Card Type | Qty | Card Cost | Totals |
|---|---|---|---|---|---|---|
| 1 | MCI | Region ABC | $ 5 Card | 5 | $ 3.00 | $ 15.00 |
| 2 | MCI | Region XYZ | $ 30 Card | 3 | $ 20.00 | $ 60.00 |
| 3 | AT&T Wireless | Los Angeles, CA | $ 50 Card | 1 | $ 35.00 | $ 35.00 |
| 4 | AT&T Wireless | Los Angeles, CA | $ 100 Card | 2 | $ 60.00 | $120.00 |
| 5 | Verizon | Louisville, KY | $ 5 Card | 5 | $ 2.00 | $ 10.00 |
|   |   |   |   |   | Grand Total: | $ 240.00 |

FIG. 16

Purchase Receipt Summary

Thank You For Your Purchase!

PRINT THIS PAGE IMMEDIATELY FOR YOUR RECORDS.
A copy of this receipt WITHOUT PINS will be emailed to your account for your records.

Purchase Order Summary

Dealer Name: XYZ Wireless
Dealer ID: 515432
Payment Type Used: ACH
Previous Account Balance: $ 1,000.00
Total Amount of Purchase Order: $ 390.00
New Balance: *$ 610.00*
Transaction Date: 02/15/2000
Transaction Number: 1554987745234

The following list of PINS were purchased:

| Carrier | Region | Card Type | PINS |
|---|---|---|---|
| MCI | Region ABC | $ 5 Card | 2165498465132132 |
| MCI | Region ABC | $ 5 Card | 9815654198510522 |
| MCI | Region ABC | $ 5 Card | 6851096519865241 |
| MCI | Region ABC | $ 5 Card | 9854103541524854 |
| MCI | Region ABC | $ 5 Card | 9651068352741551 |
| MCI | Region XYZ | $ 30 Card | 1321319849515216 |
| MCI | Region XYZ | $ 30 Card | 9541687418524156 |
| MCI | Region XYZ | $ 30 Card | 3249864138787496 |
| AT&T Wireless | Los Angeles, CA | $ 50 Card | 2165165165135165 |
| AT&T Wireless | Los Angeles, CA | $ 100 Card | 8546165165165165 |
| AT&T Wireless | Los Angeles, CA | $ 100 Card | 3549818743184945 |
| Verizon | Louisville, KY | $ 5 Card | 9816519819851565 |
| Verizon | Louisville, KY | $ 5 Card | 6549806541635241 |
| Verizon | Louisville, KY | $ 5 Card | 8541216854210556 |
| Verizon | Louisville, KY | $ 5 Card | 1354135054198604 |
| Verizon | Louisville, KY | $ 5 Card | 8754040567418653 |

If you are having any problems with the system, please send an email to prepaidservice@easywireless.com with a brief description of your problem.

FIG. 17

Prepaid Cellular PIN Ticket

Carrier: AT&T Wireless

Region: National

PIN Number: 189465216548951

Card Type: $ 30 Card

Expiration: 60 Days from date of Ticket

Ticket Date: 06/05/2000

Long Distance Rate: $ 0.12 per minute

Roaming Rate: $ 0.59 per minute

1924
- Employee ID #
- Employee_First
- Employee_Last
- Internal ID Number
- Commission %
- Quota
- Bonus %
- Bonus Rate
- Bonus Quota

1922
- Credit Card ID #
- Visa
- Mastercard
- AMEX
- Discover

1920
- Payment_Method ID #
- Credit Card
- ACH Wallet
- Cash
- Credit Account

1918
- POS Type ID #
- Public Kiosk
- Sub Dealer
- Counter Kiosk

1916
| Field | Type |
|---|---|
| Sub/Kiosk ID | # |
| Kiosk_Name | on |
| Kiosk_Icon | on |
| Kiosk_Contact_First | on |
| Kiosk_Contact_Last | on |
| Kiosk_Contact_Phone1 | on |
| Kiosk_Contact_Phone2 | on |
| Kiosk_Contact_Fax | on |
| Kiosk_Contact_Email | on |
| Kiosk_Mailing_Address1 | on |
| Kiosk_Mailing_Address2 | on |
| Kiosk_Mailing_City | on |
| Kiosk_Mailing_State | on |
| Kiosk_Mailing_ZIP | on |
| Kiosk_Mailing_Province | on |
| Kiosk_Mailing_Country | on |
| Kiosk_Billing_Contact_First | on |
| Kiosk_Billing_Contact_Last | on |
| Kiosk_Billing_Contact_Phone1 | on |
| Kiosk_Billing_Contact_Phone2 | on |
| Kiosk_Billing_Contact_Fax | on |
| Kiosk_Billing_Contact_Email | on |
| Kiosk_Billing_Mailing_Address1 | on |
| Kiosk_Billing_Mailing_Address2 | on |
| Kiosk_Billing_Mailing_City | on |
| Kiosk_Billing_Mailing_State | on |
| Kiosk_Billing_Mailing_ZIP | on |
| Kiosk_Billing_Mailing_Province | on |
| Kiosk_Billing_Mailing_Country | on |
| Kiosk_Markup_Percent | % |
| Kiosk_Federal_Tax_ID | num |
| Kiosk_SSN | num |
| Kiosk_Credit_Card_Number | num |
| Kiosk_Card ID | # |
| Kiosk_Credit_Card_Exp | date |
| Kiosk_Credit_Card_Cardholder_Billing_First | on |
| Kiosk_Credit_Card_Cardholder_Billing_Last | on |
| Kiosk_Credit_Card_Cardholder_Billing_Address1 | on |
| Kiosk_Credit_Card_Cardholder_Billing_Address2 | on |
| Kiosk_Credit_Card_Cardholder_Billing_City | on |
| Kiosk_Credit_Card_Cardholder_Billing_State | on |
| Kiosk_Credit_Card_Cardholder_Billing_ZIP | on |
| Kiosk_Wallet_Balance | curr |
| Kiosk_Wallet_Refresh | curr |
| Kiosk_Wallet_Max | curr |
| Kiosk_Bank_Routing_Number | curr |
| Kiosk_Bank_Account_Number | curr |
| Kiosk_Credit_Account_Limit | curr |
| Kiosk_Credit_Account_Balance | curr |
| Kiosk_Approved_Carriers | list |
| Kiosk_Approved_Regions | list |
| Kiosk_Approved_Denominations | list |
| Kiosk_UserName | on |
| Kiosk_Password | on |
| Dealer ID | # |
| Payment_Method ID | # |
| POS Type ID | # |

SYSTEMS, METHODS AND APPARATUS FOR RECEIPT PRINTING AND INFORMATION DISPLAY IN A PERSONAL IDENTIFICATION NUMBER DELIVERY SYSTEM

CROSS-REFERENCE TO RELATED APPLICATIONS

This application is a continuation of and claims priority to U.S. patent application Ser. No. 10/925,218, entitled METHOD AND APPARATUS FOR RECEIPT PRINTING AND INFORMATION DISPLAY IN A PERSONAL IDENTIFICATION DELIVERY SYSTEM, filed Aug. 24, 2004 now abandoned, the contents of which is incorporated by reference herein in its entirety for all purposes. This application is also related to U.S. patent application Ser. No. 10/316,603, entitled SYSTEM AND METHOD FOR DISTRIBUTING PERSONAL IDENTIFICATION NUMBERS OVER A COMPUTER NETWORK, filed Dec. 10, 2002, the contents of which is hereby incorporated by reference in its entirety for all purposes.

FIELD OF THE INVENTION

The present invention generally relates to systems, methods, and apparatus for distributing personal identification numbers (PINs) for access to pre-paid goods and services to users over a computer network. More specifically but not exclusively, the present invention relates to systems, methods, and apparatus for efficiently standardizing receipt printing and information display among the different client terminal types used in such PIN distribution systems.

BACKGROUND

There currently exist "pre-paid" telephone cards that allow a customer to purchase a desired amount of long-distance telephone time from a particular telephone service provider. These pre-paid telephone cards are often sold by dealers such as convenience stores or wireless phone stores. Pre-paid telephone cards are also often sold in airports. Vending machines for selling pre-paid telephone cards also have been developed. Each of these pre-paid telephone cards has a specific monetary denomination. For example, a customer could purchase a $10 card, a $20 card, or a $100 card. These pre-paid telephone cards are sold by particular telephone service providers such as AT&T, MCI, Sprint, etc. A customer could, for example, buy a $20 MCI card, which would entitle him or her to $20 worth of long-distance calling service provided by MCI. These cards are referred to as "pre-paid" because the customer purchases the long-distance time before he or she actually places the call. This is in contrast to the more typical post-pay service that most telephone customers use with the telephone in their residence or office. With post-pay service, customers are sent a bill on a periodic basis. The customer pays for calls that have already been made, rather than calls that will be made in the future.

Frequently, the pre-paid telephone cards that are sold by dealers or vending machines are of the "scratch-off" type. After the customer purchases a card, he or she can scratch off a layer of material, which reveals a personal identification number (PIN). The layer of scratch-off material hides the PIN from customers browsing in the store who have not purchased the card. After a customer purchases a card and scratches off the layer of material, the customer can then use the card to place a long-distance call. When the customer wishes to place a long-distance call, he or she dials a special number provided by the telephone service provider. The customer then enters the PIN written on the card. The long distance provider automatically debits the charge of the call from an account associated with the PIN.

As an example, a customer could purchase a $10 MCI card. After the customer rubs off the layer of material, a PIN number 129384348764 is revealed. When the customer wishes to place a long-distance call, the customer dials an MCI access number. The customer then enters PIN 129384348764. The long-distance carrier, MCI, identifies the PIN and recognizes that there is $10 worth of credit in this account. If the customer places a call which lasts 5 minutes and costs $4, MCI will debit the account so that $6 remains. The next time the customer places a call using that PIN number, the system will find that $6 remains in the account associated with that PIN.

One problem with these pre-paid phone cards is that the cards are required to be carried as inventory by dealers. There is substantial work and expense associated with maintaining a filled inventory of cards. First, the dealer or vending machine operator has to predict which cards will be in demand and determine how many cards of each denomination to order for each of various providers. The dealer then has to pay for the desired inventory of cards up front, which requires a significant cash outlay. The dealer then has to keep track of how many cards are left in stock for each service provider and of each different monetary denomination, and determine when to order a new batch of cards. All of these costs associated with filled inventory can be time consuming and expensive for dealers.

Another problem is that these pre-paid telephone cards are especially vulnerable to theft, loss, and other inventory "shrinkage." Because the cards are small, it is easy for a shoplifter to pocket a card unnoticed. Since these cards have a high value to them and are so easy to pocket, dealers, which sell these cards, are extremely vulnerable to inventory shrinkage.

Vending card machines have been proposed which store personal identification numbers (PINs) in a memory in the machine. A customer can then purchase a pre-paid telephone PIN by inserting cash into the machine. The machine can replenish its stock of PINs when the memory runs out of PINs or on a periodic basis by accessing a remote store of PINs via a modem.

The problem with these vending machines is that there are still significant costs associated with inventorying the PINs. The PINs are retained in a memory in the machine, which has a similar effect to storing cards. Once a PIN has been stored in the memory of a particular machine, that PIN becomes unavailable to be used by any other dealer, even if the PIN is never purchased. Additionally, if the machine was to break, or the memory was to be erased, there is a problem determining who is responsible for paying for the PINs that were contained in the memory. Additionally, decisions must still be made how many PINs to store in memory, what monetary denominations to store in memory, and for which providers to store PINs in memory. Therefore, there are still significant inventory costs associated with storing the PINs in the vending machine. Additionally, these proposed vending machines do not provide consumers the ability to obtain a PIN from the convenience of their homes or offices.

Another proposed system is based upon a web site accessed over the Internet. A customer can go to this web site and purchase pre-paid telephone service. A PIN is then e-mailed to the customer's e-mail address. One disadvantage of this service is that a customer must be able to access his or her e-mail account in order to obtain the PIN. Additionally, e-mail is often unsecure. If a computer hacker is "listening in"

on an individual's email, then the hacker can steal the PIN and use it for his own purposes. Additionally, if a customer is purchasing a PIN in a convenience store or an airport, the customer will probably not have access to his or her e-mail account. The customer may have to wait to return to his or her home or office to access the PIN. Additionally, e-mail can sometimes be slow and it may take hours or days to retrieve the message from the customers Internet Service Provider (ISP).

A system which overcomes the primary disadvantages of the systems referenced above is described in co-pending U.S. application Ser. No. 10/316,603, entitled SYSTEM AND METHOD FOR DISTRIBUTING PERSONAL IDENTIFICATION NUMBERS OVER A COMPUTER NETWORK, which is assigned to the assignee of the present invention. This co-pending application describes a system and method for providing a personal identification number (PIN) to a client terminal over a computer network. The described system and method eliminates all costs associated with filled inventory for dealers selling PINs. For example, a server receives a request for a PIN over a network, the request originating from a user at a client terminal. The request is associated with a requested monetary unit and a requested provider. The server retrieves from a database a PIN associated with the requested monetary unit and requested provider. The server transmits the retrieved PIN to the client terminal over the network, wherein the PIN is transmitted to the client terminal on-demand in response to the customer's request. No inventory of PINs is stored at the client terminal. All transmissions between the client terminal and the server are by secure transmission to prevent an eavesdropper from stealing the PIN(s).

Upon or prior to receipt of the PIN at the client terminal, the user is prompted to enter payment at the terminal for the requested PIN. After the user pays for one or more PINs, the client terminal prints a receipt for the customer, the receipt including the requested PIN number and instructions for using the PIN. The PIN can be used for accessing pre-paid telephone service. Alternatively, the PIN can be used for accessing other pre-paid goods and services such as gasoline, magazines, subway service, etc.

In many cases the client terminal may be implemented as a conventional credit/debit terminal configured with software for effecting PIN delivery in cooperation with a server as described in the above-referenced copending patent application. In this regard conventional credit/debit, check cashing, and other terminal applications are geared towards printing the same kind of receipt for each transaction. While some of the information may differ on two credit card receipts (e.g., the date and time), the general appearance and format of the two receipts is typically identical. This aspect of conventional terminal applications is ill-suited to the sale of prepaid products, as each product may require an entirely different format for the receipt which is printed. Moreover, existing prepaid cards may also change their rates, terms, and other information, which would be printed by the terminal upon the receipt.

Unfortunately, it is generally rather tedious to modify such a conventional terminal so as to change the receipt format. In particular, current industry practice is to "compile" the receipt template on a host computer as a part of the terminal application. Hence, changing an existing receipt, or adding a new receipt, inconveniently requires installing a new version of the application on the terminal.

BRIEF DESCRIPTION OF THE DRAWINGS

For a better understanding of the nature of the features of the invention, reference should be made to the following detailed description taken in conjunction with the accompanying drawings, in which:

FIG. 2A depicts a picture of a dealer-located embodiment of a client terminal;

FIG. 2B depicts an automated kiosk embodiment of a client terminal;

FIG. 2C depicts a personal computer embodiment of a client terminal;

FIG. 3 depicts a simplified example of a database record;

FIG. 14 depicts an example of a display screen shown to a user for entering data into a purchase order;

FIG. 15 depicts an example of a purchase order summary screen;

FIG. 16 depicts an example of a screen shown to a user for entering alternate credit card information;

FIG. 17 depicts an example of a purchase receipt summary screen for the purchase ordering system;

FIG. 18 shows an example of a prepaid cellular PIN receipt/ticket;

FIGS. 19A and 19B shows an example of a more detailed database record;

DETAILED DESCRIPTION OF EMBODIMENTS OF THE INVENTION

Figure 1:
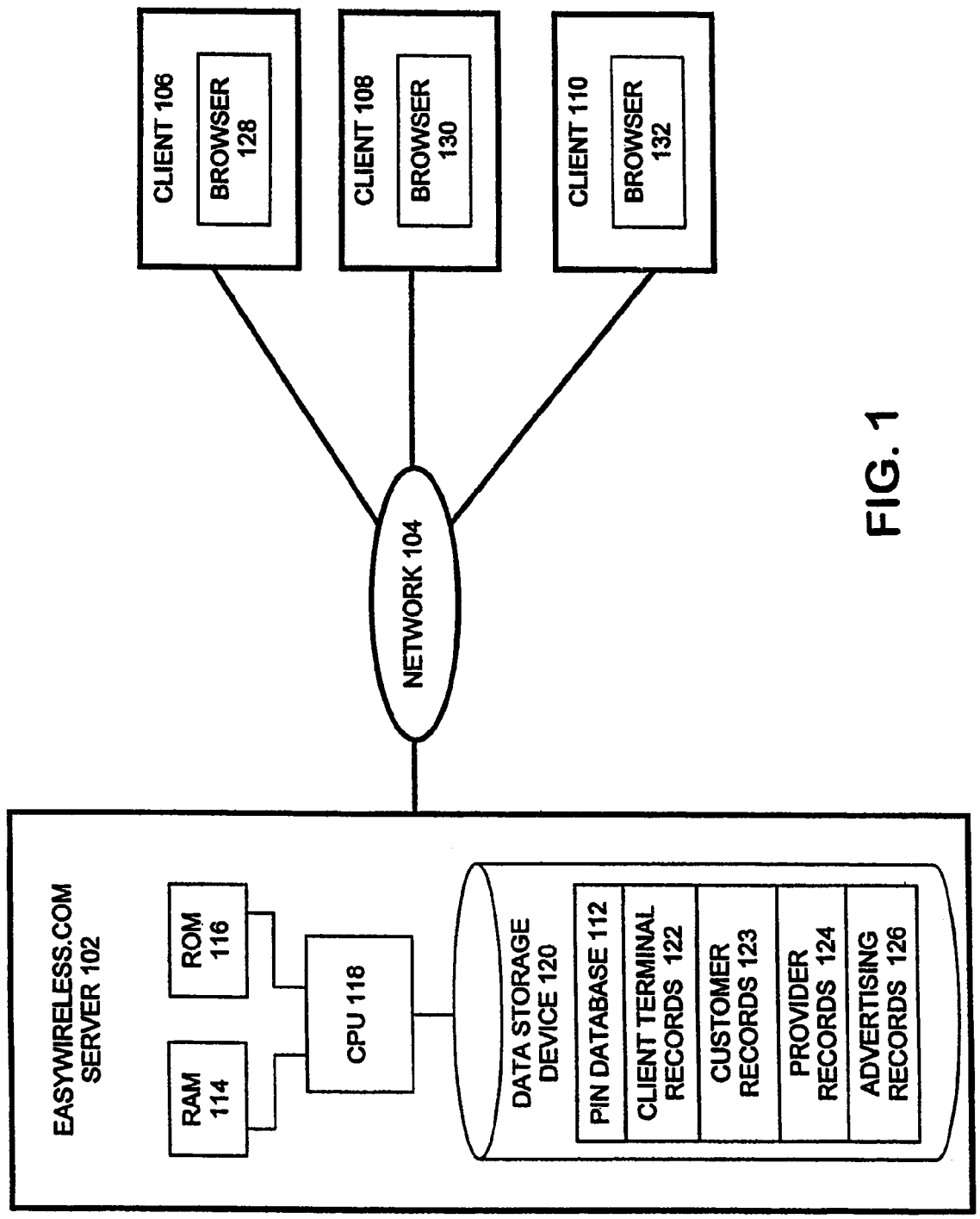
FIG. 1 depicts a block diagram of a system architecture suitable for implementing a method of distributing PINS.

The present invention relates to systems and methods of accommodating the printing of receipts of multiple different formats within a PIN delivery system, such as is described in the above-referenced co-pending U.S. application Ser. No. 10/316,603, entitled SYSTEM AND METHOD FOR DISTRIBUTING PERSONAL IDENTIFICATION NUMBERS OVER A COMPUTER NETWORK. Consistent with the invention, receipt templates for each product capable of being sold by a client terminal are downloaded to the terminal from a server. This contrasts with the current practice within the credit/debit card industry of using a hard-coded format associated with each application running on the terminal. In typical embodiments, the present invention advantageously permits receipt templates to be added or changed without changing the code of the application stored within the terminal or otherwise downloading a new version of the application. A central repository of receipt templates may be managed at the server so as to support a multiplicity of different terminals from different manufacturers. This dynamic template mechanism may also be employed to enable display of different menus and prompts on the terminal as necessary to support the distribution of different prepaid products.

As is described hereinafter, the architecture of the present invention enables changes in prepaid products and associated materials to be flexibly accommodated. In exemplary embodiments of the invention this is facilitated by retrieving from a server, at one time or another, substantially all the information printed by a client terminal upon the receipt corresponding to a prepaid product. Terminals, which may or may not be of identical type, are provided to participating merchants, with a merchant-specific configuration being downloaded from the server during the first use of the terminal. The configuration information provided to a given merchant will generally depend upon the product mix offered by the merchant (e.g., prepaid wireless and/or long distance), as well as upon the characteristics (e.g., manufacturer/model) of the terminal utilized by the merchant. This configuration information, along with other product-related information downloaded from the server, enables new prepaid products to be delivered through the terminal without modifying or otherwise updating its application code. That is, the client application code need not be aware of the particulars of the static text appearing on receipts printed by the terminal, or of which types of fields are included on a receipt. Rather, essentially all of this type of information is managed by the server and configured through an administrative interface.

Due to the quantity of unique data needed for each different prepaid transaction and the likelihood that it will regularly change, in exemplary embodiments of the invention the required processing is divided among a "download" transaction, and a "sale", "report" or "user" transaction. The "download" transaction provides various records in various files, such as the legal terms and conditions to be printed for each product sold, the names of reports and the additional information (such as start and end times) required by each report, as well as the list of carriers, categories, and denominations for all the products available for sale at a specific terminal. In addition, the download transaction also typically includes the entire configuration specific to the terminal, such as clerks authorized to use the terminal, languages supported by this terminal, screen prompts in each of those languages, and so on.

The present invention may be best understood in light of the subject matter of the above-referenced co-pending U.S. application Ser. No. 10/316,603, which is described herein with reference to FIGS. 1-19 and incorporated by reference herein in full. As one of ordinary skill in the art will recognize, many of the aspects of the systems and methods described with reference to FIGS. 1-19 are pertinent to the embodiments of the present invention described below with reference to FIGS. 20-25.

This co-pending application describes a system and method which allows a customer to purchase pre-paid amounts of any good or service, such as telephone service, gasoline, electricity, dry-cleaning, bus service, subway service, magazines, newspapers, or bundled goods and services. After the customer purchases a pre-paid amount of a good or service, the customer receives a personal identification number (PIN), which is downloaded in real-time over a network such as the Internet. The PIN is provided over the network "on-demand," meaning that the PIN is downloaded over the network immediately or very soon after receiving a request and payment from the customer. The PIN is downloaded over a network in response to the customer's request, not delivered to the customer hours or days after the request. The PIN is not stored locally at the client terminal used by the customer, but is downloaded over the Internet, thus eliminating any inventory tasks or costs associated with maintaining a filled inventory for the dealer. After the customer receives the PIN, the customer can then use this PIN at any convenient time to access the desired good or service.

The above-identified co-pending application thus provides "virtual inventory" of pre-paid cards because it removes all the burdens of inventorying pre-paid cards from the dealer. Additionally, it provides "virtual distribution" of telephone cards, because the service providers no longer have to manufacture pre-paid cards and distribute them to the dealers. Because the PINs are delivered on-demand, there is a real-time distribution and accounting. Additionally, there is an elimination of the inventory shrinkage problem created by the loss, and theft of pre-paid cards.

Moreover, the above-identified co-pending application describes a system and method for providing a personal identification number (PIN) to a client terminal over a computer network. The described system and method eliminates all costs associated with filled inventory for dealers selling PINs. For example, a server receives a request for a PIN over a network, the request originating from a user at a client terminal. The request is associated with a requested monetary unit and a requested provider. The server retrieves from a database a PIN associated with the requested monetary unit and requested provider. The server transmits the retrieved PIN to the client terminal over the network, wherein the PIN is transmitted to the client terminal on-demand in response to the customer's request. No inventory of PINs is stored at the client terminal. All transmissions between the client terminal and the server are by secure transmission to prevent an eavesdropper from stealing the PIN(s).

The PIN can be used for accessing pre-paid telephone service. Alternatively, the PIN can be used for accessing other pre-paid goods and services such as gasoline, magazines, subway service, etc.

The server can transmit to the client terminal a plurality of products or services available. The server then receives from a user at the client terminal a selection of one of the available products or services. The server transmits to the client terminal a plurality of provider names for the requested product or service. The server receives from a customer at the client terminal a selection of one of the available provider names. The server transmits to the client terminal a plurality of monetary denominations available for the requested provider. The server receives from the client terminal a selection of one of the available monetary denominations. The server transits to the client terminal a plurality of regions available for the requested provider. The server receives from the client terminal a selection of the one of the available regions. The server can receive a request from the client terminal to view rate information. The server then transmits rate information to the client terminal.

The user is then prompted at the client terminal to enter payment for the requested PIN. The user can enter payment a) inserting cash into a receptacle at the client terminal, or b) entering credit card or debit card or smart card information or swiping a card through a receptacle, or c) paying cash to an operator associated with the client terminal. If the user pays a dealer, the dealer remits a portion of the payment to an account associated with the server by a) transferring funds from a dealer's account into the account associated with the server by an electronic funds transfer, or b) charging a portion of the payment to a dealer's credit account, or c) charging a portion of the payment to a dealer's credit card.

After the user pays for one or more PINs, the client terminal prints a receipt for the customer, the receipt including the requested PIN number and instructions for using the PIN. Additionally, a purchase ordering method is described in the above-identified pending application whereby a dealer can buy PINs in bulk and receive a wholesale discount. The dealer can place multiple individual purchase orders at once, each individual purchase order associated with a requested provider, a requested monetary denomination, and a requested number of PINs.

The system of the above-identified co-pending application allows a customer to purchase pre-paid amounts of any good or service, such as telephone service, gasoline, electricity, dry-cleaning, bus service, subway service, magazines, newspapers, or bundled goods and services. After the customer purchases a pre-paid amount of a good or service, the customer receives a personal identification number (PIN), which is downloaded in real-time over a network such as the Internet. The PIN is provided over the network "on-demand," meaning that the PIN is downloaded over the network immediately or very soon after receiving a request and payment from the customer. The PIN is downloaded over a network in response to the customer's request, not delivered to the customer hours or days after the request. The PIN is not stored locally at the client terminal used by the customer, but is downloaded over the Internet, thus eliminating any inventory tasks or costs associated with maintaining a filled inventory for the dealer. After the customer receives the PIN, the customer can then use this PIN at any convenient time to access the desired good or service.

FIG. 1 depicts a block diagram of a system for distributing PIN numbers. PIN server 102 is coupled to network 104. Server 102 can be any large computer or network device. Network 104 can be any network connecting computers such as the Internet. Client terminals 106, 108, and 110 are running browser programs 128, 130 and 132, respectively. Browsers 128, 130, and 132 are any program that allows client terminals 106, 108, and 110 to access PIN server 102 over network 104.

PIN server 102 contains RAM 114, ROM 116, CPU 118, and data storage device 120. CPU 188 runs the software, which is operating the method depicted in FIG. 2. Data storage device 120 contains a personal identification number (PIN) database 112. PIN database 112 stores PINs, which are available for purchase by customers. The PIN provides access to a pre-paid amount of a good or a service. PIN database 112 is described in more detail with respect to FIG. 3.

Data storage device 120 also includes client terminal records 122. Client terminal records store information concerning where client terminals are located. Client terminal records 122 can store any information specific to specific client terminals, such as previous purchase history, payment and account information, and terminal preferences.

Data storage device also includes customer records 123. Customer records 123 provide information unique to individual customers. For example, as will be discussed later with respect to FIG. 2C, customers can access PIN server 102 through a home personal computer. Customers can identify themselves and provide identifying information. PIN server 102 can use this information to provide better service to the customer, to target advertising to the customer, or to store payment or credit accounts. When a customer accesses PIN server 102 from a client terminal in a retail store, in most instances the customer will prefer to remain anonymous. In this case, PIN server 102 will not store any customer information in customer records 123.

Data storage device 120 also contains provider records 124. These records contain information pertinent to providers who are providing PINs for PIN database 112. For example, these records can contain addresses, billing information, and telephone numbers. Data storage device 120 also contains advertising records 126. Advertising records 126 contain information about advertising banners and links that can be provided to client terminals 106, 108 and 110 as an additional source of revenue.

Because the PINs are valuable and could be subject to theft and copying by electronic piracy, communications network 104 between PIN server 102 and client terminals 106, 108 and 110 is protected by the use of encrypted communications and well-known security techniques. Client terminals 106, 108, and 110 can provide security certificates to PIN server 102 to authenticate their transmissions.

FIGS. 2A-2C depict three alternative physical embodiments of client terminals 106, 108 and 110. FIG. 2A depicts a physical embodiment, which is used in a typical checkout counter of a store, such as a convenience store. Client terminal 200 of this embodiment includes a touch-screen 204. Various options appear on touch-screen 204, which a customer may activate by touching an appropriate location on touch-screen 204. A customer makes payment by paying cash to a store clerk operating cash register 202. Alternatively, a customer can pay with a credit card by swiping a credit card through credit card slot 208. Buttons 206 can be used by the customer in addition to touch-screen 204 to make additional selections, such as choosing a particular type of credit card.

FIG. 2B depicts an alternative physical embodiment for the client terminal, automated kiosk 210. Automated kiosk 210 includes a touch-screen 212. Credit card receptor 214 allows a consumer to submit payment by inserting a credit card. Alternatively, the customer can insert bills into bill receptor 218, or coins into coin receptor 220. The customer can optionally make selections by entering data on keypad 216 in addition to making selections with touch-screen 212.

FIG. 2C depicts another alternative physical embodiment for a client terminal. Personal computer 222 can be used in the convenience of a customer's home or office to access the PIN server 102, by entering an appropriate URL in the customer's browser. The customer can then purchase PIN(s) from the PIN server 102 from the customer's personal computer 222.

FIG. 3 depicts a simplified example of records within PIN database 112. Another, more detailed example of records within PIN database 112 is described later with respect to FIGS. 19A and 19B. PIN database 112 stores PINs, which are available for purchase by customers. PIN database 112 contains records 312. Good/Service field 301 specifies the name of a good or service, which is available for pre-paid purchase. For example, records 312a-312p shown in FIG. 3 contain PINs, which provide access to pre-paid cellular service. Records 312q-r shown in FIG. 3 contain PINs, which provide access to pre-paid gasoline. Other goods and services can be also be included in PIN database 112 such as electricity, cable service, satellite TV, etc.

Provider field 302 contains the name of the particular good or service provider associated with the record. For example, FIG. 3 shows records for AT&T, AIRTOUCH, SPRINT, and MOBIL. Value field 304 specifies the dollar value associated with each record. For example, record 312h provides a customer with $50 of pre-paid cellular service from AIRTOUCH. PIN field 306 specifies the PIN, which is provided to the customer and allows access to the good or service. Rate field 308 specifies a rate associated for each record. For example, for cellular telephone service rate field 308 specifies the calling rate associated with the record. In the example PIN database 112 shown in FIG. 3, rate field 308 is not used for gasoline records 312q and 312r, since the gasoline rate is determined at the pump.

Expiration field 310 contains an expiration date beyond which the PIN for that record will no longer be valid. Other fields may also be added. Some fields may be particular to a specific good or service. For example, if gasoline is being sold then there may be a field for "Octane" which specifies the octane level of gasoline being purchased.

Figure 4A:
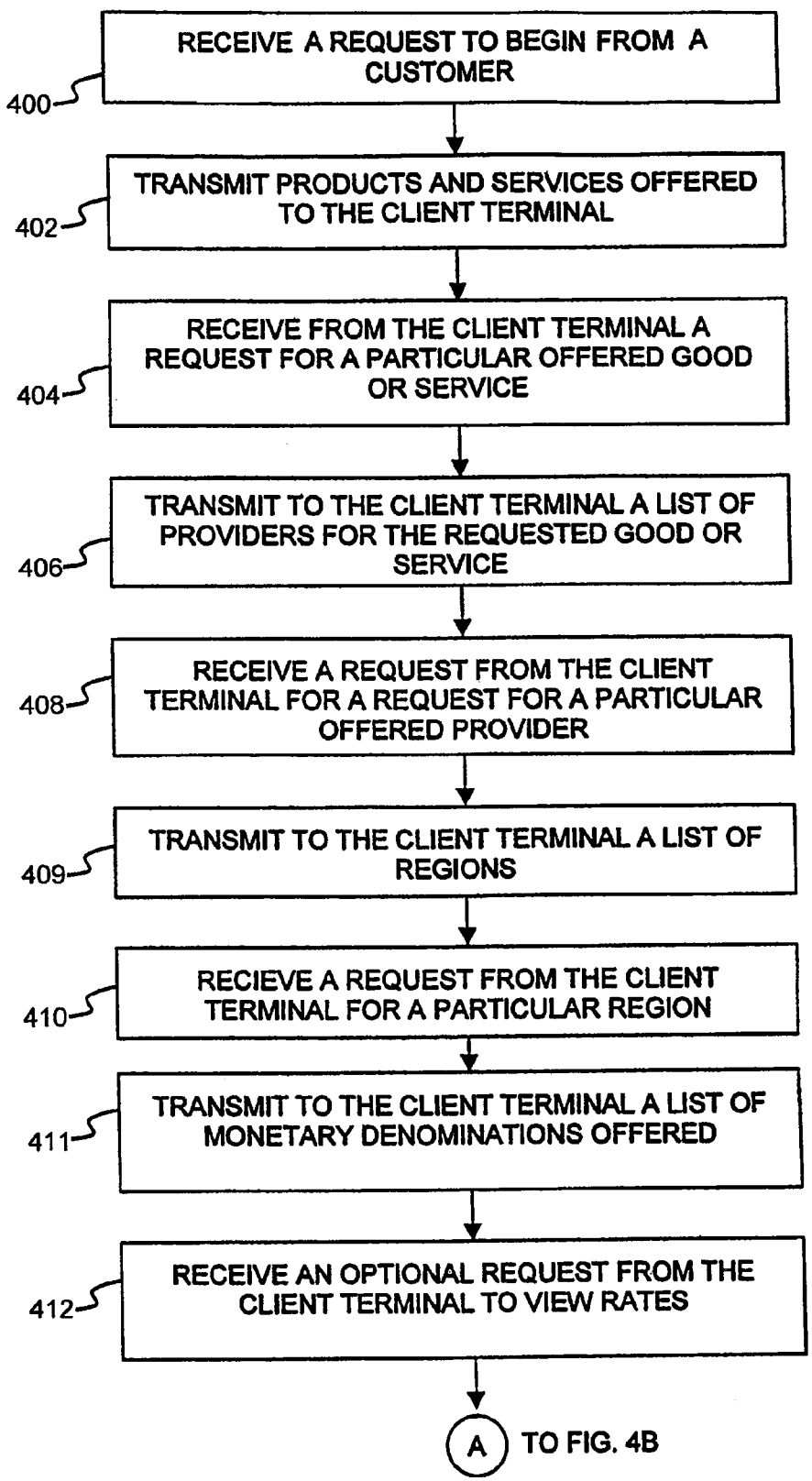
FIGS. 4A and 4B depict a flowchart illustrating a method of purchasing one or more PINs.
Figure 4B:
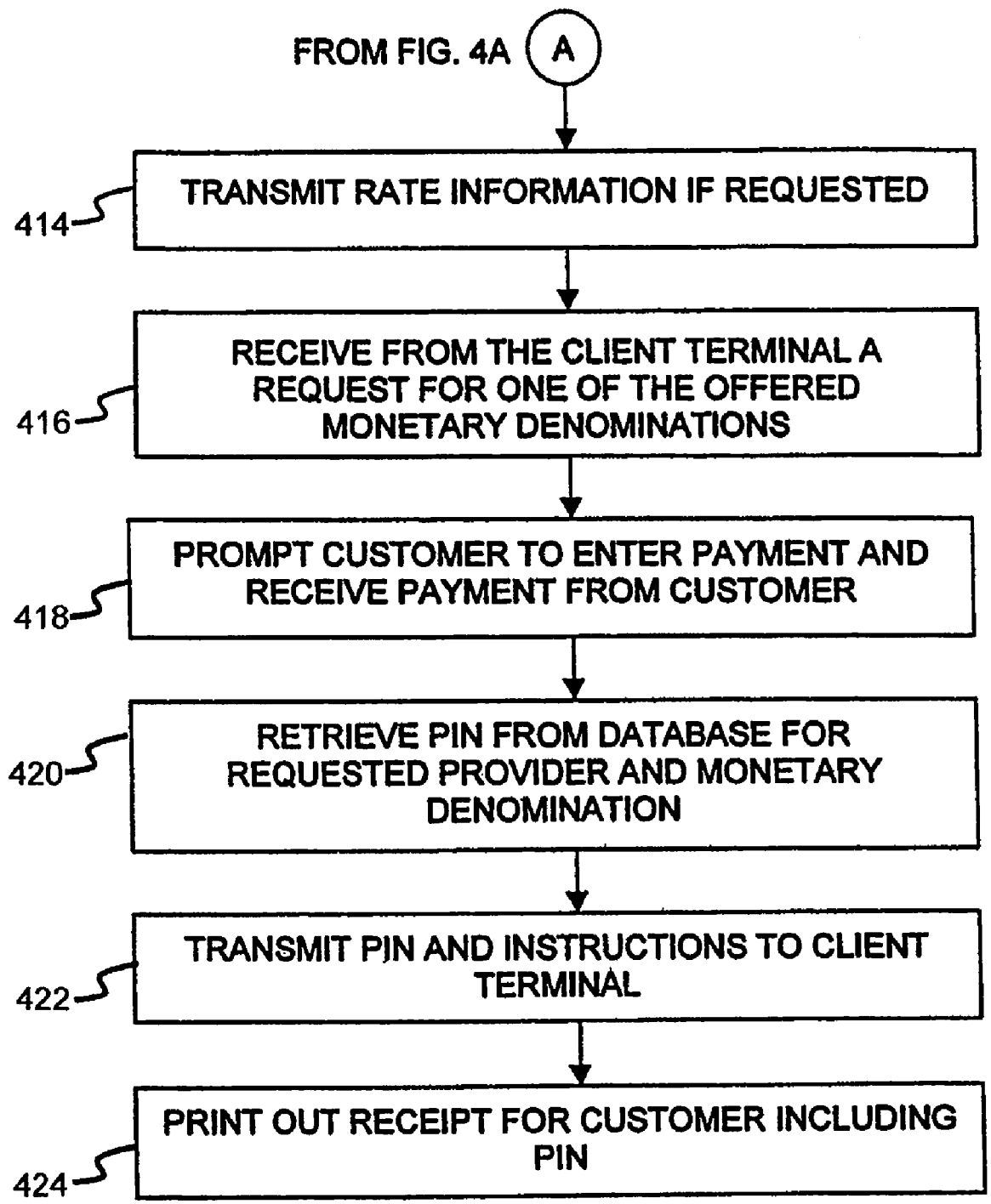

FIG. 4A depicts a flowchart illustrating a method of operating PIN server 102. Initially, in step 400, the PIN server receives a request from a customer to begin. For example, a customer entering a retail store approaches client terminal 200 shown in FIG. 2A. A "BEGIN" Window displayed on touch-screen 204 reads "Touch here to begin." The customer approaches the touch-screen 204 and touches the BEGIN Window. This sends a request to begin to PIN server 102. In step 402, in response to receiving a request to begin, PIN server 102 transmits to the client terminal a list of products and services offered. For example, PIN server 102 could transmit: 1) cellular telephone service, 2) long-distance telephone service, 3) electricity, 4) gasoline, and so on. All of these goods and services would be available to the customer to purchase on a pre-paid basis. The list of products and services transmitted to the client terminal appears, for example, on touch-screen 204 shown in FIG. 2A. The customer then touches a desired good or service on touch-screen 204. This sends a request for the chosen good or service back to PIN server 102. For example, the customer selects "cellular telephone service."

In step 404, PIN server 102 receives the request from the client terminal for the chosen good or service. In this example, PIN server 102 receives a request for cellular telephone service. In step 406, the PIN server 102 transmits to the client terminal a list of providers for the requested good or service. For example, if the customer has requested cellular telephone service, PIN server 102 transmits a list of: AT&T, AIR TOUCH, and SPRINT. The customer then selects one of these offered providers by touching an option on touch-screen 204. This would send a request back to PIN server 102 for a particular requested provider. For example, the customer could select "AIRTOUCH."

In step 408, PIN server 102 receives the customer's request for the particular provider requested.

In step 409, PIN server 102 transmits to the client terminal a list of regions for the requested good or service. For example, if the customer requested "AIRTOUCH" in step 408, then PIN server 102 would transmit a list of regions such as "AIRTOUCH NORTHEASTERN U.S.," or "AIRTOUCH NEW YORK CITY METROPOLITAN REGION," OR "AIRTOUCH PACIFIC REGION," etc. In step 410, PIN server 102 receives the customer's request for a particular region.

In step 411, PIN server 102 transmits a list of pre-paid monetary denominations offered. For example, if a request for "AIRTOUCH" is received, pre-paid cellular service for AIRTOUCH in the following monetary denominations could be offered: $10, $20, $50, and $100. Thus, a customer could choose to buy a $50 "virtual" phone card, which would provide him or her with $50 of pre-paid cellular service.

The PIN server 102 can determine what monetary denominations are available by one of the following methods. As a first method, PIN server 102 checks provider records 124, and looks up the record corresponding to the chosen provider (for example, AIRTOUCH). PIN server 102 then checks a field of the provider record to determine what monetary values are offered. As a second method, PIN server 102 checks PIN database 112, and determines what types of monetary denominations are available. For example, PIN server 102 can determine that it is presently out of stock of $50 AIRTOUCH PINs, but PIN server 102 has available $10 PINs, $20 PINs, and $100 PINs. As an example, the customer could choose to purchase a $50 PIN from AIRTOUCH. The customer would receive a PIN, which would allow him or her to purchase $50 of cellular telephone service. As an alternative to transmitting a list of offered monetary denominations, in step 410, the customer could alternatively be allowed to simply type in at a keypad a desired amount of service that he or she desires. For example, a message would appear on touch-screen, 204 stating "TYPE IN AN AMOUNT OF PRE-PAID SERVICE YOU WISH TO PURCHASE." The customer could then type in, for example, $50. PIN server 102 could then check PIN database 112 to see if it had any $50 PIN denominations available. If there was no $50 PINs available, PIN server 102 could, for example, transmit a message stating, "THERE ARE NO $50 PINS AVAILABLE. WOULD YOU LIKE TO PURCHASE A $40 PIN OR A $75 PIN?" Alternatively, PIN server 102 could transmit a message stating "THERE ARE NO $50 PINS AVAILABLE FOR AIRTOUCH. HOWEVER, SPRINT AND MCI OFFER $50 PINS FOR CELLULAR TELEPHONE SERVICE. WOULD YOU LIKE TO PURCHASE FROM ONE OF THESE PROVIDERS?"

The customer can also be given an option to "View Rates." If the customer chooses this option, then a request to view rates is sent to the PIN server 102. In step 412, the request is received by PIN server 102. In step 414, PIN server 102 transmits rate information to the client terminal. For example, the rate information could specify that a $100 "virtual" pre-paid phone card purchased from AIRTOUCH has a cellular calling rate of $0.35 per minute, and the PIN expires in 6 months. A $5& virtual pre-paid phone card purchased from AIRTOUCH has a cellular calling rate of $0.40 per minute, and the PIN expires in 8 months. Providers may choose to offer lower rates for larger pre-paid purchases as a high volume discount. Further information can also be requested and provided to the customer depending on the particular product or service purchased. For example, if the customer is purchasing gasoline, the customer could request current price per gallons at various gas station locations for various octane levels.

In step 416, PIN server 102 receives from the client terminal a request for one of the available monetary denominations. For example, the customer could select an option to purchase a $50 PIN from AIRTOUCH by touching the appropriate option on touch-screen 204.

In step 418, PIN server prompts the customer at the client terminal to make payment for the requested PIN. Payment can be made by the customer in a number of ways. In the embodiment shown in FIG. 2A, the customer can pay the dealer by cash, credit card, debit card, smart card or any similar method (the customer pays a cashier behind cash register 202). Once the customer pays the dealer, then the dealer must transfer a portion of the payment to PIN server. Payment can be apportioned and transferred between the dealer and the operator of the PIN server by a number of methods. Some example methods:

First method "ACH WALLET": The dealer has a special account set up with the operator of the PIN server. The dealer stores money in the account before the PIN is purchased. Immediately before a customer purchases one or more PINs, the dealer pays a portion of the payment to the operator of the PIN server by transferring money from the dealer's account to such operator by ACH (automated clearing house) electronic funds transfer. This method of payment is referred to as "ACH wallet."

Second method "CREDIT ACCOUNT": The dealer has a credit account with the operator of the PIN server. The dealer is allowed a predetermined amount of credit based on the creditworthiness of the dealer. When a customer pays for one or more PINs, a portion of the payment is charged to the dealer's credit account. The dealer is then billed later for the amount charged.

Third method: The dealer simply provides credit card information to the PIN server. When customer purchases one or more PINs, a portion of the payment is charged to the dealer's credit card.

Fourth method: The customer's credit card information (or debit card, or smart card) is sent directly to the PIN server. The operator of the PIN server then charges the customer's credit card and sends a portion of the payment back to the dealer.

As will be understood by one skilled in the art, the above methods are by example only and there are a multitude of ways that payment can be arranged between the dealer and the operator of the PIN server. All of these methods do have one thing in common, however. The PIN is sent by the PIN server right after a payment is made (either by cash or credit). This makes the delivery of the PIN "on demand" and eliminates costs associated with filled inventory. Because the PIN is sent right after payment is made, the dealer has no costs associated with filled inventory. For example, the dealer does not have to contact the operator of the PIN server at the beginning of each month and order $10,000 worth of cards. The dealer does not have to predict which cards will be popular, and how many cards to order of each type. Payment for the PIN is charged at the time of each transaction, and thus the dealer has no filled inventory costs.

In the automated kiosk embodiment shown in FIG. 2B, the customer can enter payment by swiping a credit card through credit card receptor 214, or inserting cash into bill receptacle 218 or coin receptacle 220. Using the personal computer of FIG. 2C, the customer can enter payment by typing in his or her credit card information.

After payment has been received and verified in step 418, then in step 420 PIN server retrieves a PIN from the database having the appropriate characteristics selected by the customer. For example, if the customer chose to purchase a $50 virtual pre-paid phone card for pre-paid cellular telephone service from AIRTOUCH, then PIN server 102 could retrieve record 312ƒ shown in FIG. 3. In step 422, PIN server 102 transmits PIN 0948574995 (this PIN is shown in PIN field 306 of exemplary record 312ƒ in FIG. 3) to the customer at the client terminal. Once a PIN has been retrieved from PIN database 112 and transmitted to the customer, the PIN record is marked as sold and unavailable from PIN database 112 so that it will not be sent to another customer. Alternatively, the PIN record can be marked as used, so that it will not be retrieved for another customer.

PIN server 102 also transmits any instructions necessary to use the PIN. For example, PIN server 102 can transmit a telephone access number, which the customer needs to dial before placing a cellular telephone call and entering the PIN. The telephone access number and other instructions will be unique for each provider. These instructions can either be stored in each individual record 312 in PIN database 112, or the instructions can be stored in provider records 124.

The customer could also request to receive multiple PINs. For example, the customer could purchase 3 $50 PINs for AIRTOUCH cellular telephone service. After the customer enters $150 in payment, PIN server 102 transmits 3 $50 PINs to the customer at the client terminal.

At step 424, the client terminal prints out a receipt for the customer. The receipt includes the requested PIN(s) purchased by the customer, and any instructions for using the PIN such as a telephone access number. The receipt can also contain advertisements. Advertisers pay the operator of PIN server 102 for the opportunity to have their ads displayed on receipts. The receipt is a printed piece of paper. Alternatively, the receipt could be in the form of a plastic card. PIN server 102 then returns back to the first step 400, waiting for the next customer to request to "BEGIN".

Figure 5:
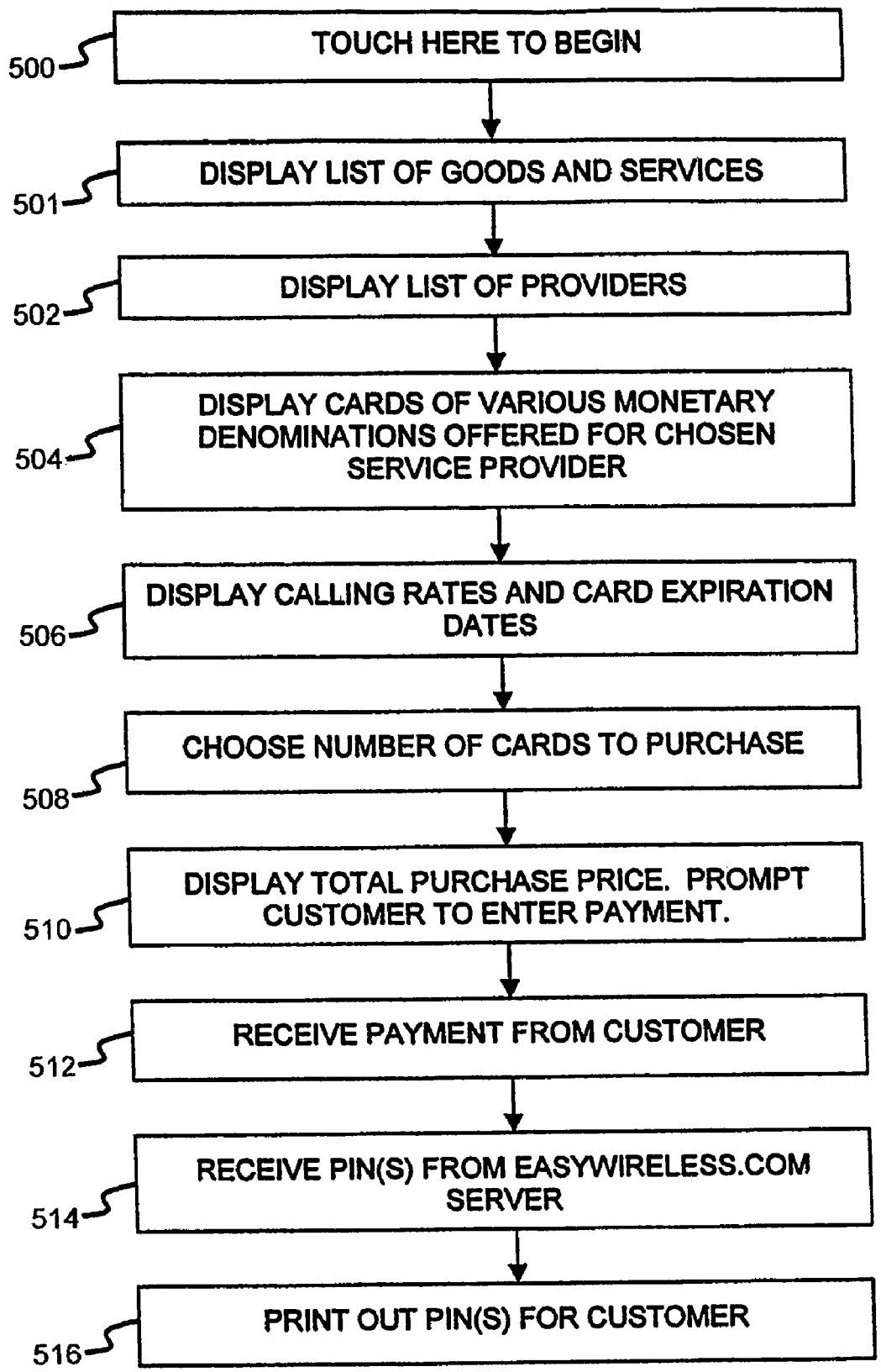
FIG. 5 depicts a flowchart illustrating a method of operating a client terminal.

FIG. 5 depicts a flowchart illustrating a method of operation of client terminals 106, 108, 110 (shown in FIG. 1), 200, 210, and 222 (shown in FIG. 2). FIGS. 6-10 show exemplary displays to be shown on the screen of the client terminal. The method of operation will now be described with reference to the flowchart of FIG. 5 and the screens shown in FIGS. 6-10.

In step 500, a window appears which states "TOUCH HERE TO BEGIN." The customer can begin by touching the touch-screen 204 or 212 in the appropriate location. If the customer has accessed the PIN server 102 by using personal computer 222, the customer can begin by entering an appropriate URL into the browser. This would bring the customer to the web page running on PIN server 102. The customer could click on a link labeled "BEGIN" to begin the purchase process.

Figure 6:
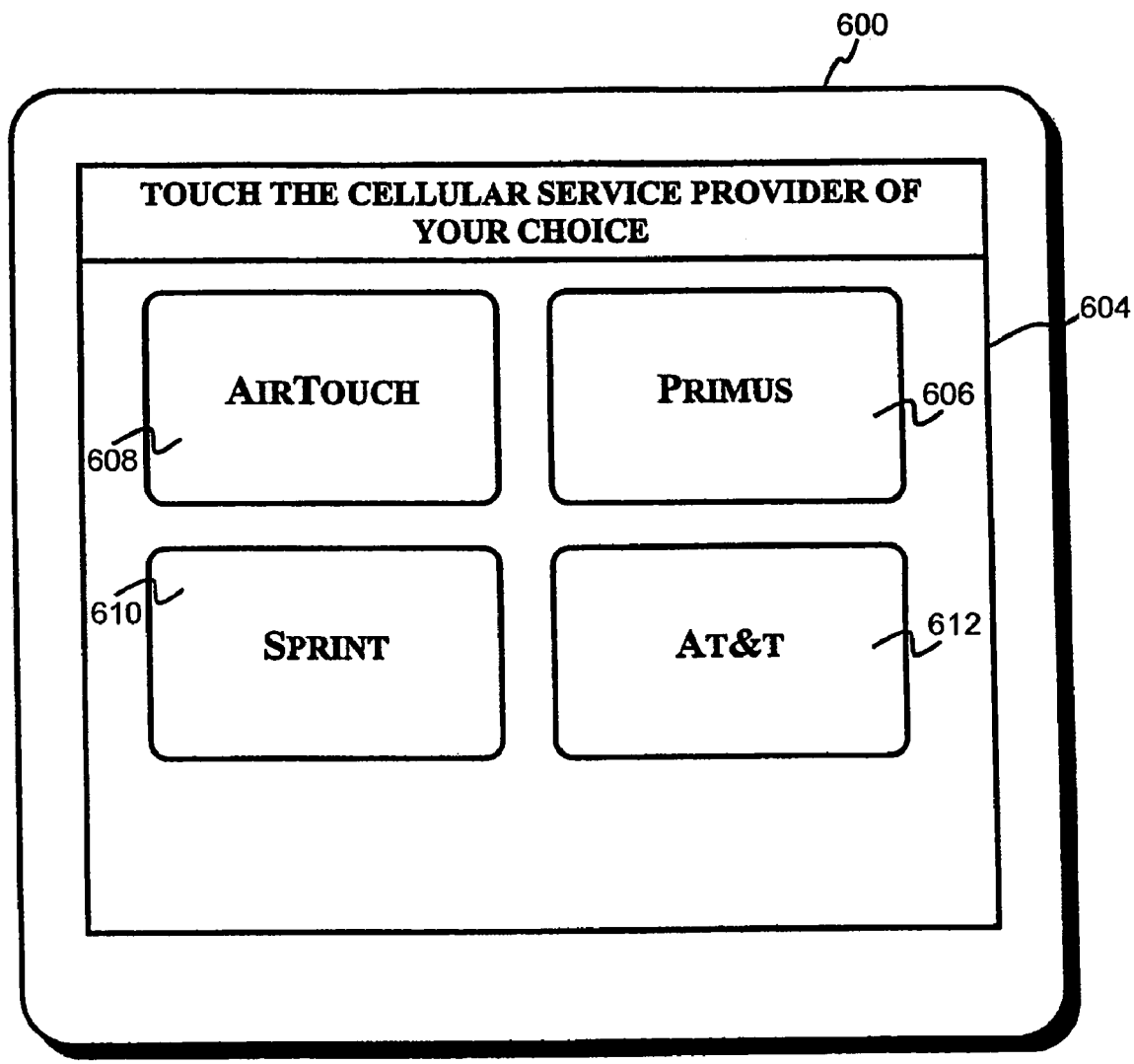
FIG. 6 depicts an example of a display allowing the user to choose a provider.

In step 501, the client terminal displays list of offered goods and services, such as cellular telephone service, gasoline, electricity, dry-cleaning, etc. The customer can then choose one of these goods or services to purchase. Assume, for this example, that the customer has selects "cellular telephone service". In step 502, the customer is provided with a list of providers for the chosen good or service and asked to choose a provider. FIG. 6 shows an exemplary screen corresponding to step 502 (assuming that the customer has selected "cellular telephone service"). Touch-screen 600 displays browser window 604. Four service provider options are shown: AIR TOUCH option 608, PRIMUS option 606, SPRINT option 610 and AT&T option 612. For the purposes of this example, assume that a customer touches AIRTOUCH option 608.

Figure 7:
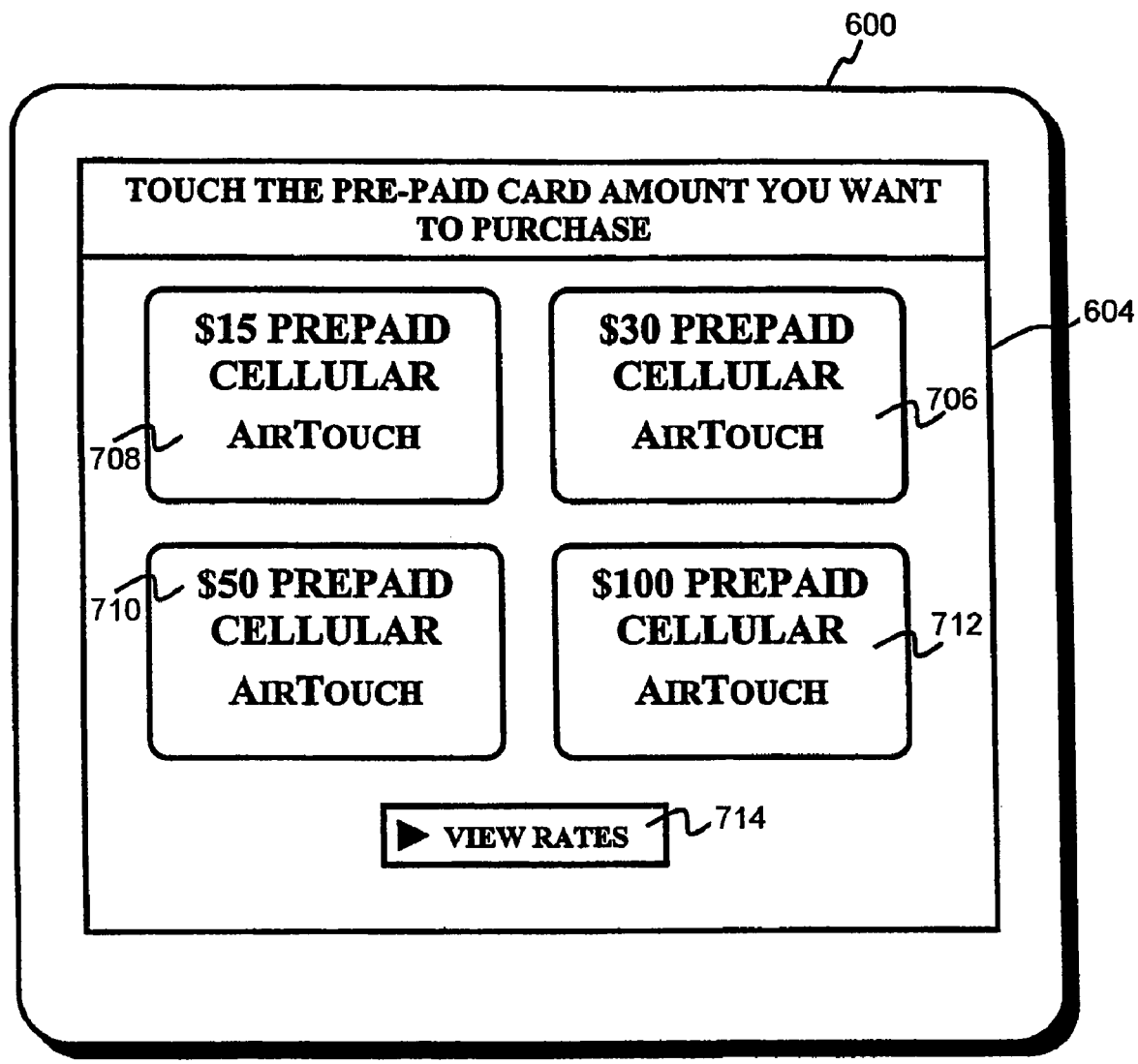
FIG. 7 depicts an example of a display allowing the user to choose a monetary denomination.

In step 504, the display screen displays virtual cards of various monetary options, which are offered, for the chosen good or service provider (which in this example is AIR-TOUCH). FIG. 7 shows an exemplary display screen corresponding to step 504. Four possible monetary denominations may be selected. The customer can choose the $15 option 708, $30 option 706, $50 option 710, or $100 option 712.

Figure 8:
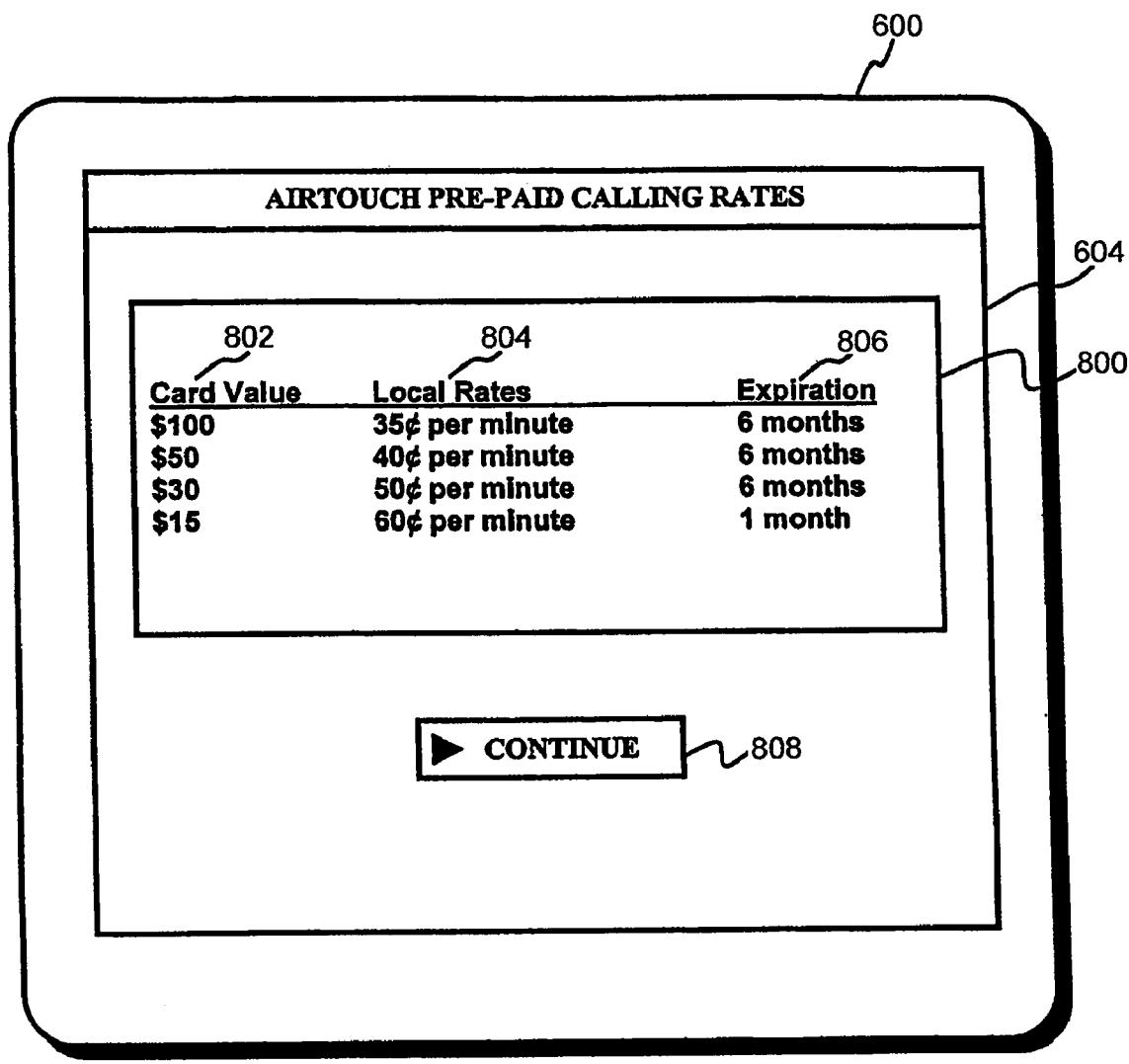
FIG. 8 depicts an example of a display showing the user rate and expiration information.
Figure 9:
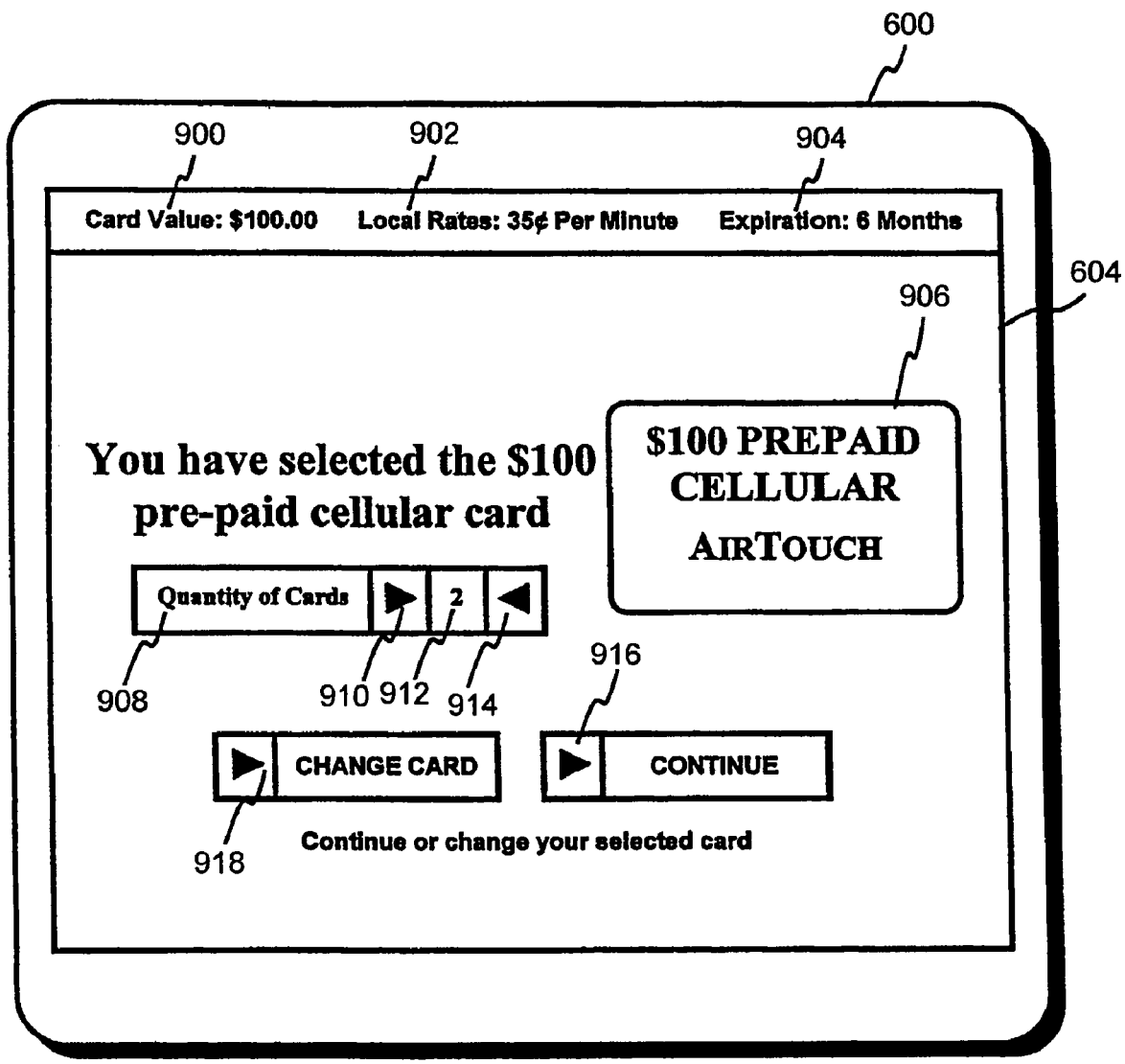
FIG. 9 depicts an example of a display allowing the user to choose a quantity of cards.

In step 506, the display screen displays rate information, if desired by the customer. The customer is given the option of viewing rates by touching the VIEW RATES option 714 shown in FIG. 7. If the customer decides to touch VIEW RATES option 714, then in step 506, the screen displays calling rates, card expiration dates, or any other information applicable to the chosen good or service, or specific to the particular good or service provider chosen. For example, if the customer who has chosen to purchase AIRTOUCH cellular service, touches the VIEW RATES option 714, then FIG. 8 shows an exemplary screen. Information window 800 provides a number of information fields. Card value field 802 displays the various virtual card monetary values offered. Local rates field 804 displays the calling rate per minute for each card value. Expiration field 806 displays the expiration date beyond which the PIN is no longer usable. As shown in FIG. 8, AIRTOUCH offers a discount for higher value card purchases. In other words, the calling rate goes down for higher card value purchases. By touching the continue field 808, the customer can return to the screen shown in FIG. 7.

In FIG. 7, the customer selects a particular monetary denomination offered by touching the screen in an appropriate location. In this example, assume that the customer has chosen the $100 virtual card option 712. This brings up the display shown in FIG. 9. In step 508, the customer is given the choice of how many cards he or she wishes to purchase. The quantity of cards window 908 in FIG. 9 displays the number of virtual cards to be purchased. The customer can touch arrow 910 to increment the number of virtual cards to be purchased. The number of cards to be purchased is shown in box 912. The customer can touch arrow 914 to decrement the number of virtual cards to be purchased. Field 900 and virtual card 906 display the monetary value of the virtual card that was chosen by the customer. Local rates field 902 displays the calling rate for the chosen virtual card. Expiration field 904 displays when the virtual card will expire.

If the customer changes his or her mind, and wishes to purchase a card with a different value, the customer can return to the screen shown in FIG. 7 by touching the CHANGE CARD field 918. Otherwise, the customer can proceed by touching the CONTINUE field 916. This brings up the display shown in FIG. 10A, corresponding to step 510. Field 1000 displays the total purchase price. Since the customer has requested to purchase two pre-paid virtual $100 cards from AIR TOUCH, the total purchase price is $200. Field 1002 instructs the customer to insert payment. This message could alternatively tell the customer to enter credit card information, swipe a credit card, a debit card, a smart card, or pay cash to a cashier depending on the particular client terminal being used and/or a chosen method of payment.

Figure 10A:
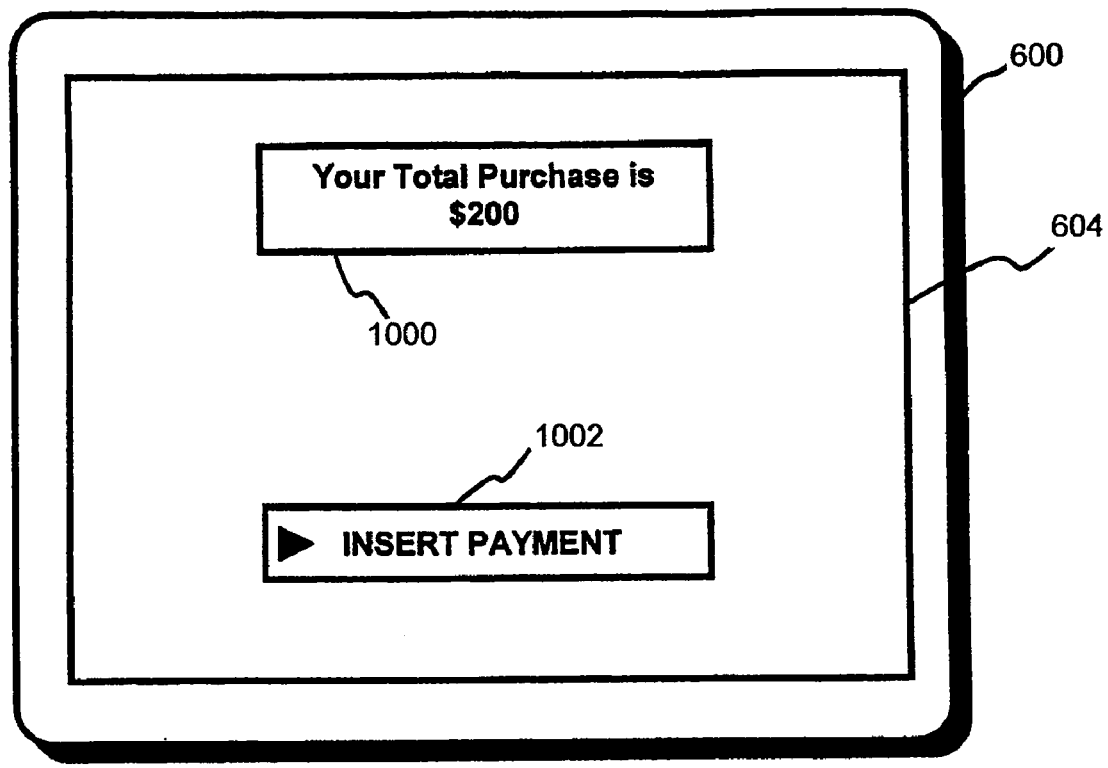
FIG. 10A depicts an example of a display screen requesting payment from the user.
Figure 10B:
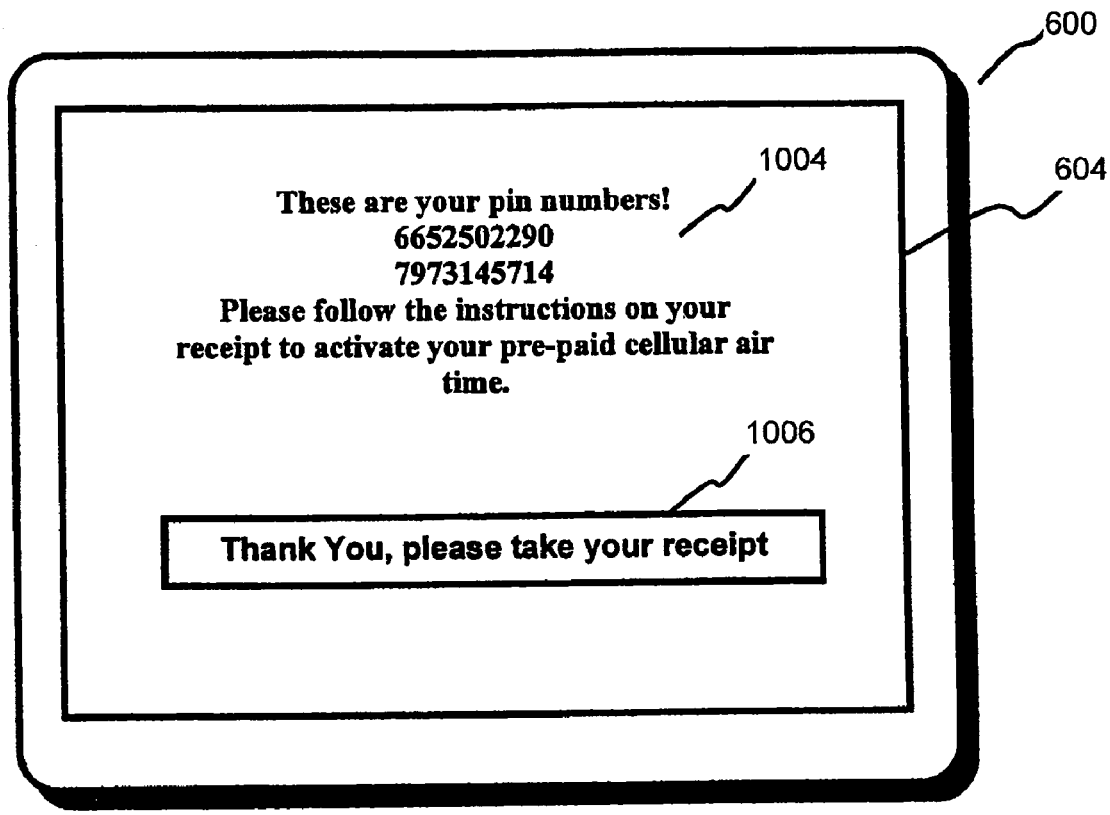
FIG. 10B depicts an example of a display screen showing the user his or her purchased PIN(s)

In step 512, payment is received from the customer. After payment has been received and verified, PIN server 102 retrieves the requested PIN(s) from PIN database 112 and transmits the requested PIN(s) to the client terminal in step 514. The PIN(s) can be displayed on the screen as shown in FIG. 10b, field 1004. Message 1006 informs the customer to take a receipt. A receipt is printed out in step 516. The receipt will contain the requested PIN(s) and any instructions necessary for using the PIN such as an access number to call. If privacy is a concern, it might be preferable not to display the PINs on the screen, but instead to only print the PINs on the receipt.

Figure 11:
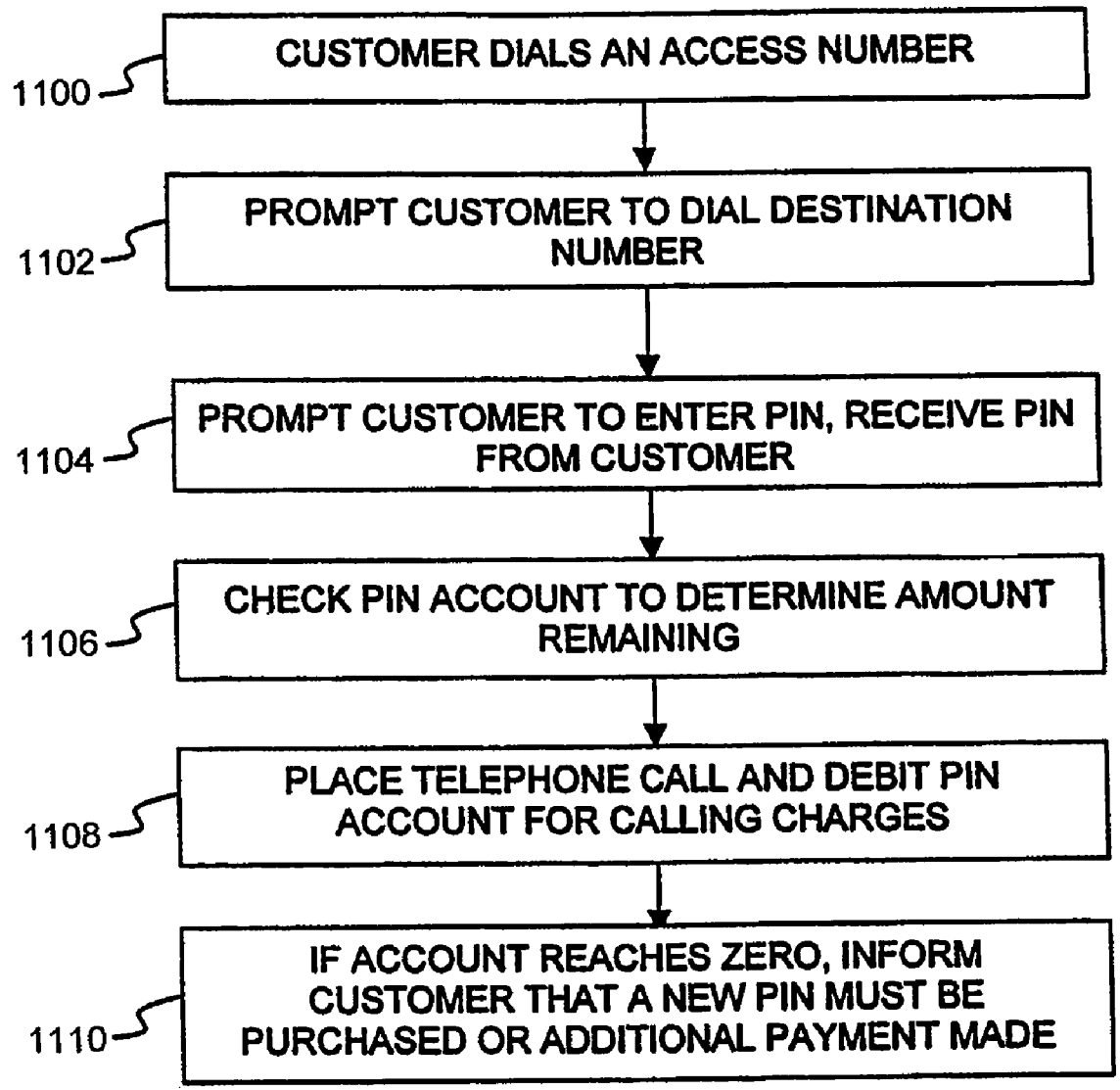
FIG. 11 depicts a flowchart illustrating a method of using a PIN to access telephone service.
Figure 12:
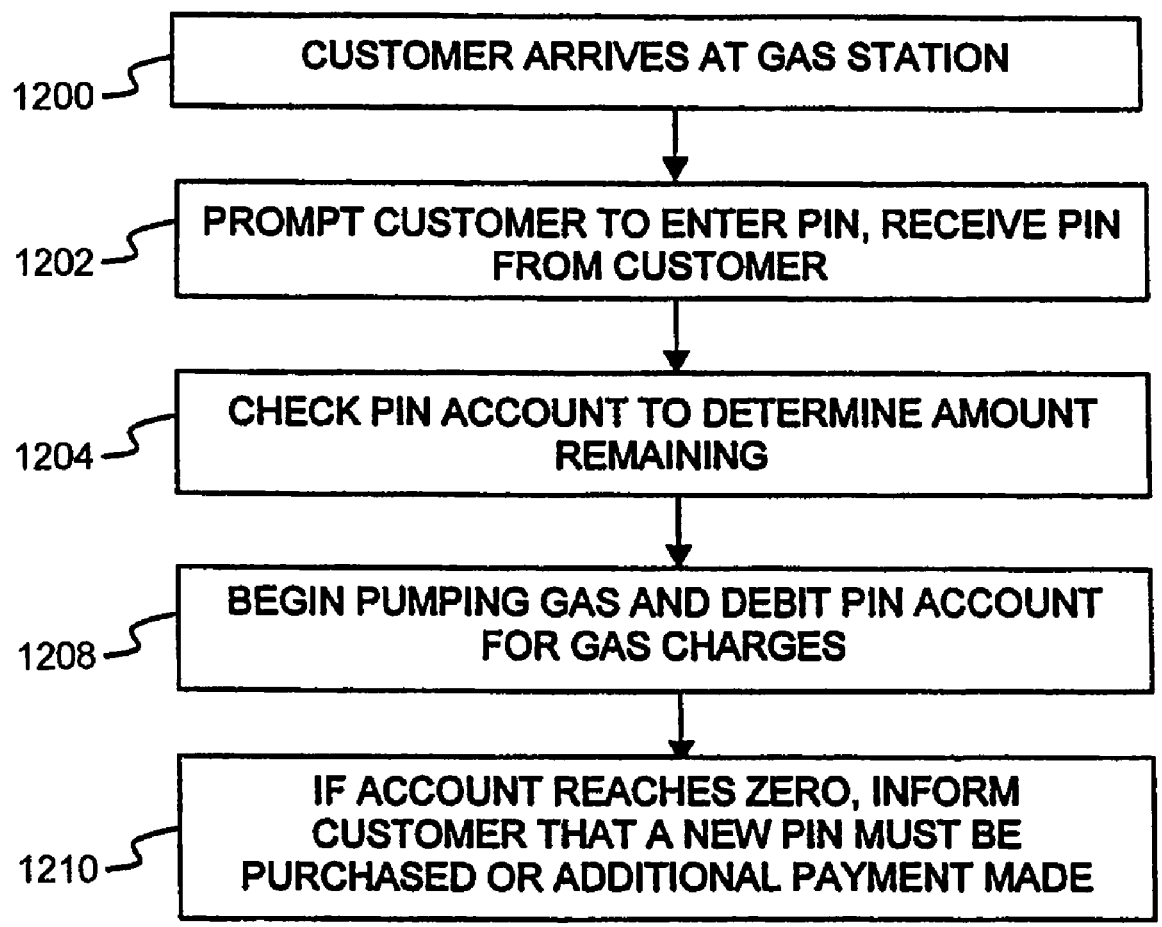
FIG. 12 depicts a flowchart illustrating a method of using a PIN at a gas station.

FIGS. 11 and 12 depict a flowchart illustrating a method of using the PIN once the customer has received the PIN from PIN server 102. FIG. 11 shows an exemplary method, which assumes that the customer has purchased pre-paid telephone service. As an example, assume that a customer has purchased $50 of pre-paid telephone service. A receipt was printed out for the customer providing a PIN and a telephone access number. In step 1100, the customer dials the access number, which was provided on the receipt. Typically, the access number is specific to the chosen service provider. For example, if the customer has previously purchased $50 of pre-paid telephone service from AIRTOUCH, the customer will be given an AIRTOUCH access number. When the customer dials the access number, the customer's call will be routed to a switch operated by AIRTOUCH. The access number is preferably a toll-free 1-800 number or a local number. In step 1102, the customer is prompted to dial the destination number that he or she wishes to call. In step 1104, the customer is prompted to enter a PIN, which was printed out, on the receipt. The customer then dials in his or her PIN. An AIRTOUCH server then checks a PIN account for the entered PIN. In step 1106, the AIRTOUCH server checks to see how much money is remaining in the account. If there is enough money left in the pre-paid account to place the desired call, then the call to the destination number is placed in step 1108. While the call is continuing, the PIN account is debited in accordance with the calling charges. In step 1110, if the account value reaches zero, the customer is informed that a new PIN must be purchased or additional payment must be made. As an option, the customer can be allowed to dial in a credit card number to continue with the call.

FIG. 12 depicts a flowchart illustrating a similar method to FIG. 11. However, FIG. 12 depicts an example where the customer has purchased pre-paid gasoline. For this example, assume that a customer has previously purchased $50 of pre-paid MOBIL gasoline. A receipt was printed out for the customer providing a PIN. In step 1200, the customer arrives at a local MOBIL gas station. The customer uses a keypad and display screen at a self-service pump. The customer pushes a button indicating that he or she wishes to pay with a pre-paid PIN account. In step 102, the customer is prompted to enter a PIN. The customer enters the PIN for which he or she prepaid. The PIN is sent to a server operated by MOBIL. The server checks a PIN account for that PIN to determine how much money is remaining in the account. If there is money left in the pre-paid account, then the customer is told to begin pumping. The pre-paid PIN account is then debited in accordance with charges for the gasoline pumped. If the account reaches zero, the customer is informed that additional payment must be made.

PIN server 102 essentially serves as a PIN warehouse. The operators of PIN server 102 can obtain PINs from various providers in two ways. A first method of obtaining PINs from providers is as follows. PINs are purchased by the operator of the PIN server 102 directly from the providers. For example, a $10 pre-paid PIN could be purchased from AIRTOUCH at a wholesale price of $8 and then stored in PIN database 112. In other words, AIRTOUCH sells the PIN to the operator of the PIN server 102 for $8, and the operator resells the PIN to the customer for $10. Thus, the operator would make a $2 profit on the sale of the PIN.

A second method of obtaining and selling PINs is as follows. The PINs are received from various providers at no cost to the operator of the PIN server 102, who serves as a warehouse for the PINs. After a PIN is sold to a customer, the payment received from the customer is forwarded to the appropriate provider, minus a commission for such operator.

Another feature of the system is the ability to offer discounts. PIN server 102 can send advertisements and discount offers to the client terminals. Service providers can offer discounts such as "PRE-PAID CELLULAR SERVICE AT 30 CENTS PER MINUTE. 10 CENTS PER MINUTE CHEAPER THAN NORMAL RATE!" Providers will be happy to provide such discounts for pre-paid purchase because there are many advantages to selling pre-paid service. The provider does not have to worry that the customer won't pay his bills, because the calls are pre-paid. The provider does not have to keep track of billing addresses and mailing bills to the customer. The provider gets the money before the call is even made, and thus earns interest on the money. Because of these advantages of pre-paid service, it is often advantageous to providers to offer a discount for pre-paid purchases.

FIGS. 13-16 depicts a purchase-ordering feature. The purchase ordering feature is intended to be used by dealers who wish to purchase a batch of various types of PINs, for the purpose of reselling these PINs to individual customers. The purchase order feature allows a dealer to order a desired assortment of PINs from different providers of different denominations.

Figure 13:
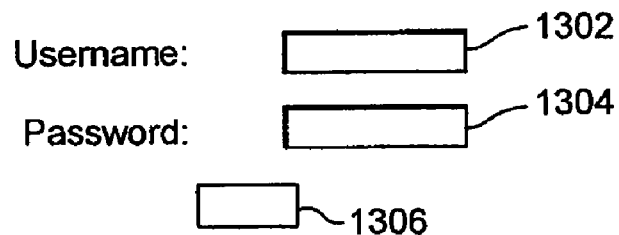
FIG. 13 depicts an example display screen for allowing a user to log-in to a purchase ordering system.

FIG. 13 depicts an example of a login screen for allowing a user to enter the purchase ordering system. To enter the purchase ordering system, the user must be a registered user. Typically, users of the purchase ordering system will be dealers who resell the PINs to other customers. The dealers can buy PINs in bulk, and thus receive a special wholesale discount. As an option, in addition to dealers, preferred customers could be allowed to use the purchase ordering system. A user enters his or her user name in username field 1302 and enters a password in password field 1304. The user then hits the Enter button 1306.

If the user's username and password is recognized as being a registered user, then the purchase order data entry screen is displayed as shown in FIG. 14. Dealer Information field 1402 displays the name, address, and any other pertinent identifying information of the dealer who has logged in to the purchase order data entry system. If other customers besides dealers are allowed to log in to the purchase order data entry system, then field 1402 can be labeled "customer information" or "user information."

Payment method field 1404 displays the payment method and details, such as credit card information, or ACH wallet, etc. Current balance field 1406 displays whether the user has an outstanding balance: i.e. either the dealer owes money to the operator of the PIN server 102 or has a certain amount of credit remaining.

Table 1407 allows the dealer to many individual purchase orders. Each row of the table represents one individual purchase order. For example, the dealer can order ten $50 cards from AT&T, and 20 $100 cards from Sprint, and 15 $75 cards from Verizon Wireless, etc.

Carrier column 1408 allows the user to select a unique carrier for each purchase order of PINs. Region column 1410 allows the user to select a particular region for each separate purchase order of PINs. Card type column 1412 allows the user to select a particular card monetary denomination for each separate purchase order of PINs. Qty column 1414 allows the user to select a quantity of cards to purchase for each separate purchase order of PINs. Wholesale column 1416 displays the wholesale per-PIN price for each separate purchase order of PINs.

Totals column 1418 displays the total price paid for each purchase order. Totals column 1418 field is simply the wholesale column price 1416 multiplied by the Qty column 1414. Add/Del column 1420 allows the dealer to confirm the addition of each individual purchase order, or to change his mind and delete an entered order. Grand total field 1421 displays the sum of all the individual totals from each individual purchase order.

As an example of an individual purchase order, the first row shown in FIG. 14 indicates that the user has selected one order of Verizon Wireless PINs for the Northwest region. The dealer has ordered five $30 PINs. The dealer is getting a discount, so the dealer only has to pay $25 for the $30 PIN. The total paid for the dealer for that individual purchase order is $250.00. If the dealer changes his mind, and wishes to erase this order, he can do so by clicking "DEL."

If the user wishes to cancel his or her order, the user can click Cancel Order button 1426. If the user wishes to update the price totals shown in column 1418 and field 1421, the user can hit the Update Order button 1422. If the user is satisfied with what he or she has entered, then the user can proceed with the order by clicking the Update Order button 1426. This brings up the Purchase Order Summary screen displayed in FIG. 15.

The Purchase Order Summary screen shown in FIG. 15 allows the user to review his or her entire purchase order and check that everything has been entered correctly. If the user wishes to change something, the user can click Change Purchase Order button 1502. This will take the user back to the Purchase Order Data Entry screen displayed in FIG. 14.

If the user is satisfied with the purchase order summary displayed in FIG. 15, then the user can click Submit P.O. button 1506. The user will automatically be charged by whatever payment method was previously selected (e.g. charged to an on-file credit card, ACH funds transfer, etc.). The user will then get a printed out receipt. A typical receipt is shown in FIG. 17 and will be discussed later.

If the user wishes to pay by an alternate credit card, he or she can click Pay With Alternate Credit Card 1504. This takes the user to the Alternate Credit Card Payment screen shown in FIG. 16. The user can then enter credit card information in the Billing Information fields.

FIG. 18 shows an example of a Prepaid cellular PIN ticket 1800. Ticket 1800 is the receipt that is printed out when an individual user orders a single PIN from PIN server 102 from one of the embodiments shown in FIG. 2 (this receipt is not from the purchase ordering system which has a more elaborate printout shown in FIG. 17).

Figure 19A:
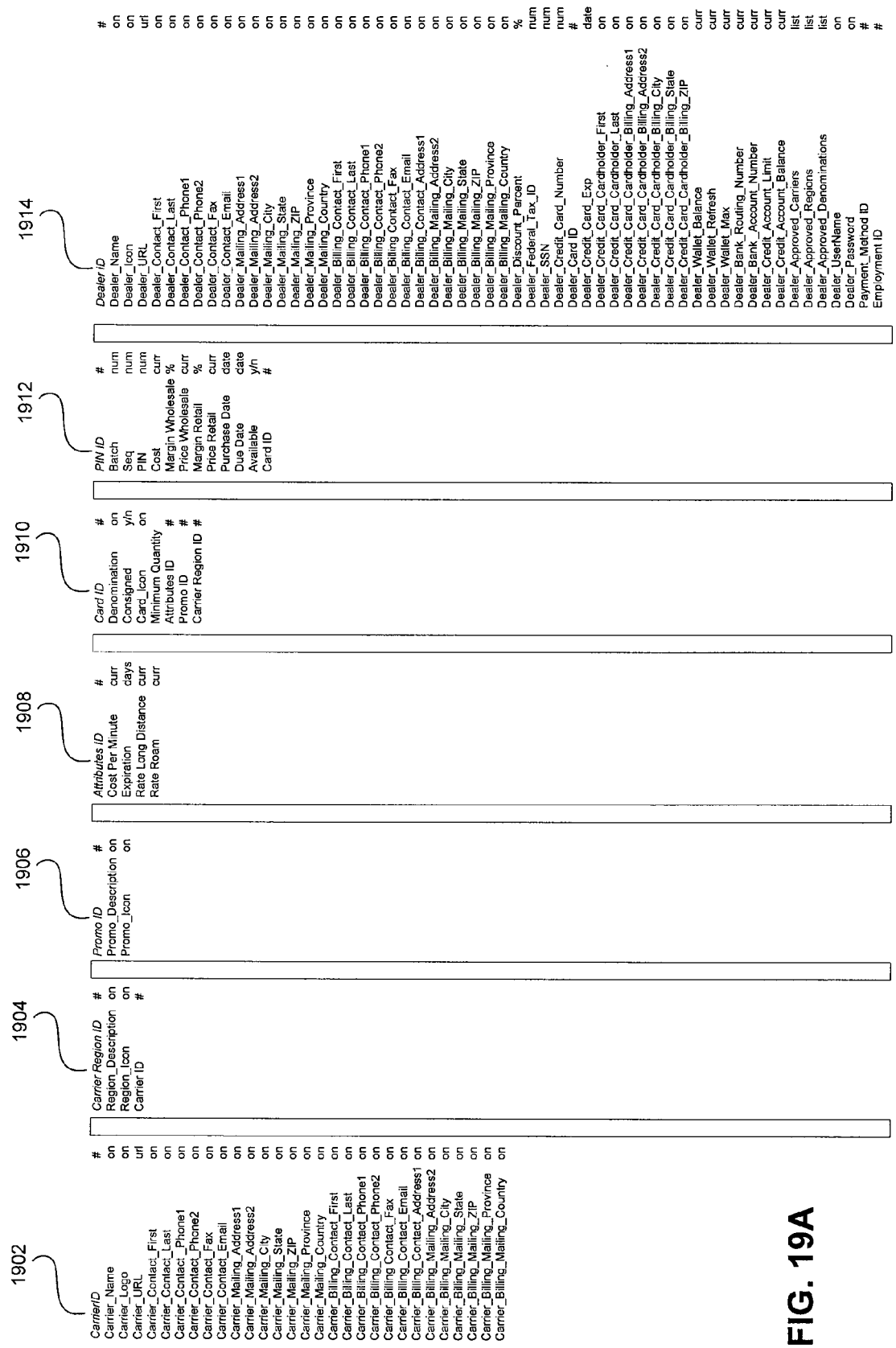

FIGS. 19A and 19B depict another example of a database record in PIN database 112. This example shows a more detailed record than the example record shown in FIG. 3. Carrier ID fields 1902 contains fields providing information pertaining to the individual carrier selected. Carrier region fields 1904 contains fields providing information pertaining to the carrier region selected. Promo ID fields 1906 contains information pertaining to any promotional program(s) that the PIN was purchased under. Attributes fields 1908 contains information pertaining to the PIN attributes such as the calling cost per minute, PIN expiration, long distance rate, and roaming rate. Card ID fields 1910 contains various identification fields associated with the PIN. PIN ID fields 1912 contain fields providing information pertaining to PIN identification. Dealer ID fields 1914 contain information pertaining to the dealer where the PIN is purchased. When a PIN is purchased at a dealer, Dealer ID fields 1914 gets filled in with the corresponding dealer information. Sub/kiosk ID fields 1916 contain information pertaining to a kiosk where the PIN is purchased. When a PIN is purchased, these fields get filled in with the kiosk information associated with the kiosk where the PIN was purchased. POS Type ID fields 1918 contain additional information pertaining to kiosk identification. Payment_method ID fields 1920 contain information pertaining to the method of payment. Credit Card ID fields 1922 contain credit card information, if the PIN was purchased by credit card. Lastly, Employee ID fields 1924 contain information pertaining to an employee who may have made the PIN sale, and any commission, which the employee receives for the sale.

Every PIN in PIN database 112 has its own associated record, as shown in FIGS. 19A and 19B. The records shown in FIGS. 19A and 19B are directed towards wireless telephone service. However, different types of records can be used which are tailored to the product or service being sold, such as gasoline. Each PIN has its own associated record as shown in FIGS. 19A and 19B, even before the PIN is purchased. Every time a new PIN is created in the system, a new record is made. When the PIN is purchased by a customer or dealer, the information about the sale is filled in to the appropriate fields in the record, and the record is marked as sold so that the PIN is not resold to another customer or dealer.

Figure 20:
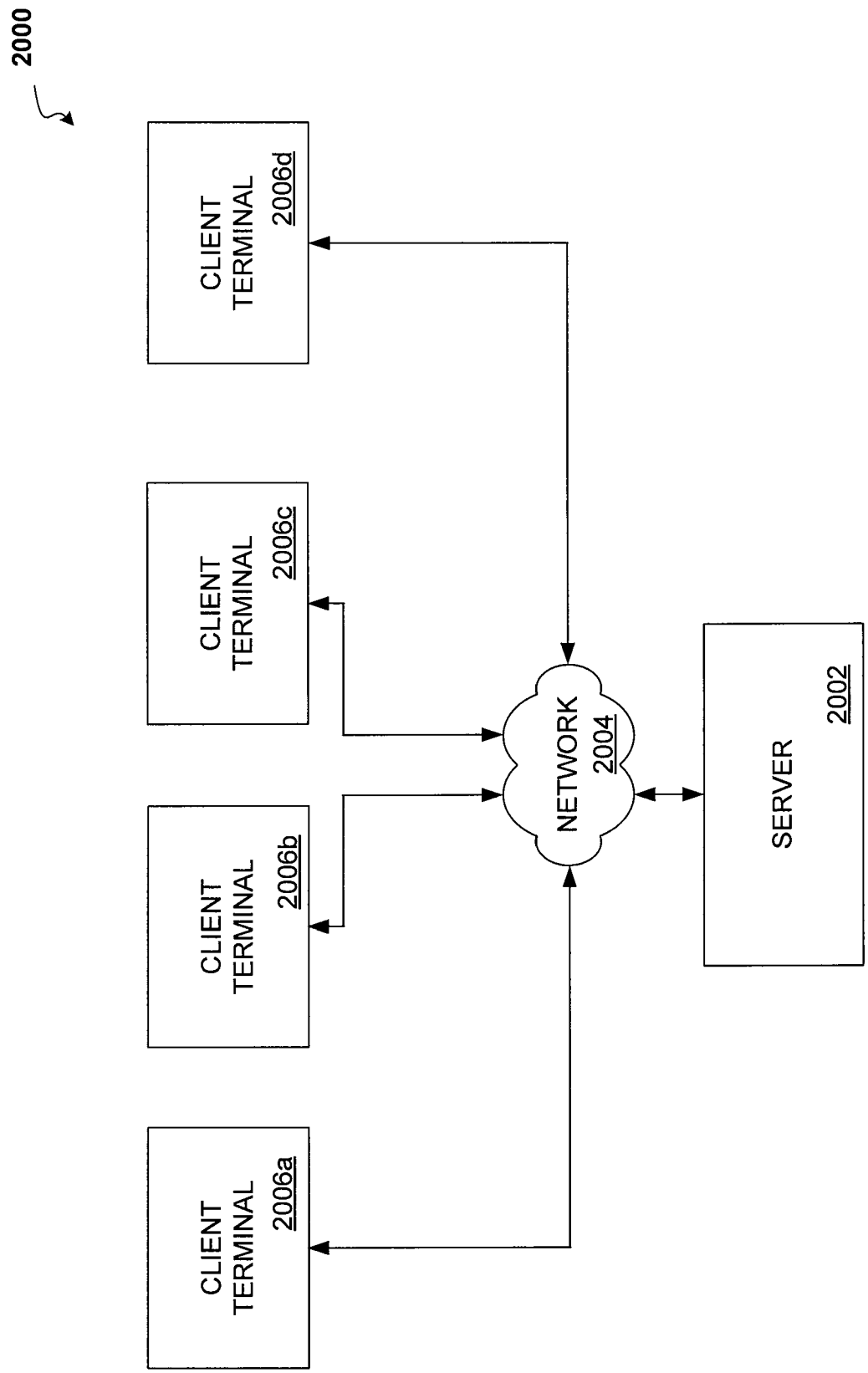
FIG. 20 shows an overview of a system for distributing PINs within which is incorporated an embodiment of the present invention.

Referring next to FIG. 20, shown is an overview of a system 2000 for distributing PINs within which is incorporated an embodiment of the present invention. As shown, server 2002 is coupled to network 2004. Server 2002 can be any large computer or network device. Network 2004 can be any network connecting computers, such as the Internet or the conventional telephone network (POTS). Client terminals 2006a-d are communicatively coupled to the server 2002 via the network 2004.

Except as otherwise described below, the client terminals 2006$_{a-d}$ are configured to operate in much the same way as the client terminals 106, 108, 110 (described with reference to FIG. 1) in accessing server 2002 via network 2004 for the purpose of obtaining PINs. However, the client terminals 2006$_{a-d}$ of FIG. 20 are also configured to obtain receipt and screen display templates from the server 2002 so as to facilitate receipt printing and information display in accordance with the present invention. Similarly, the server 2002 is configured to operate in much the same way as the server 102. However, the server 2002 in the present embodiment is also disposed to download receipt and screen display template files to the client terminals 2006$_{a-d}$. As one of ordinary skill in the art will appreciate, any of the client terminals described herein may be realized by a combination of hardware and software which may be implemented in a variety of programmable devices.

PINs delivered by the client terminals 2006$_{a-d}$ may be associated with offerings (e.g., product/service, region, denomination) in a variety of ways, and such PINs may be requested in a variety of ways. In some embodiments, each PIN is identified and requested by a stock keeping unit (SKU) and/or universal product code (UPC). In these embodiments each SKU or UPC summarizes an offering of a service/product, a region (i.e., that the service/product is available or applicable), the provider (e.g., carrier) of the product/service and/or the denomination (e.g., monetary value). As a consequence, a user's selection may include a particular product/service, a provider and/or denomination, and in the exemplary embodiment, the user's client terminal 2006$_{a-d}$ associates an SKU or UPC with the user's selection. The client terminal 2006$_{a-d}$ then requests a PIN by its corresponding SKU or UPC number.

Figure 21:
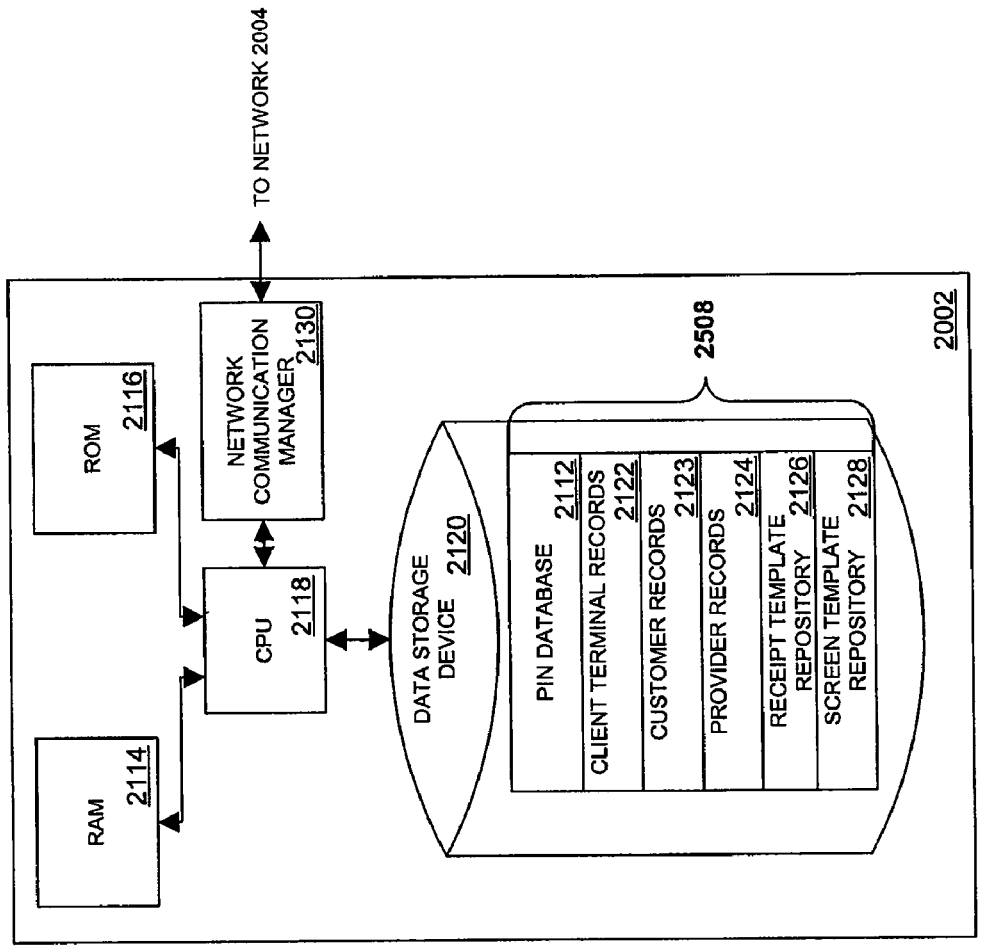
FIG. 21 shown is a schematic diagram of the structure of one embodiment of a PIN server included within the system of FIG. 20.

Referring next to FIG. 21, shown is a schematic diagram of the structure of one embodiment of the server 2002. As shown, the server 2002 includes many of the same components of the server 102 described with reference to FIG. 1 including RAM 2114, ROM 2116, CPU 2118, a data storage device 2120, and a network communication manager 2130. The data storage device 2120 contains a personal identification number (PIN) database 2112, client terminal records 2122, customer records 2123, provider records 2124, receipt template repository 2126 and screen template repository 2128.

Figure 22:
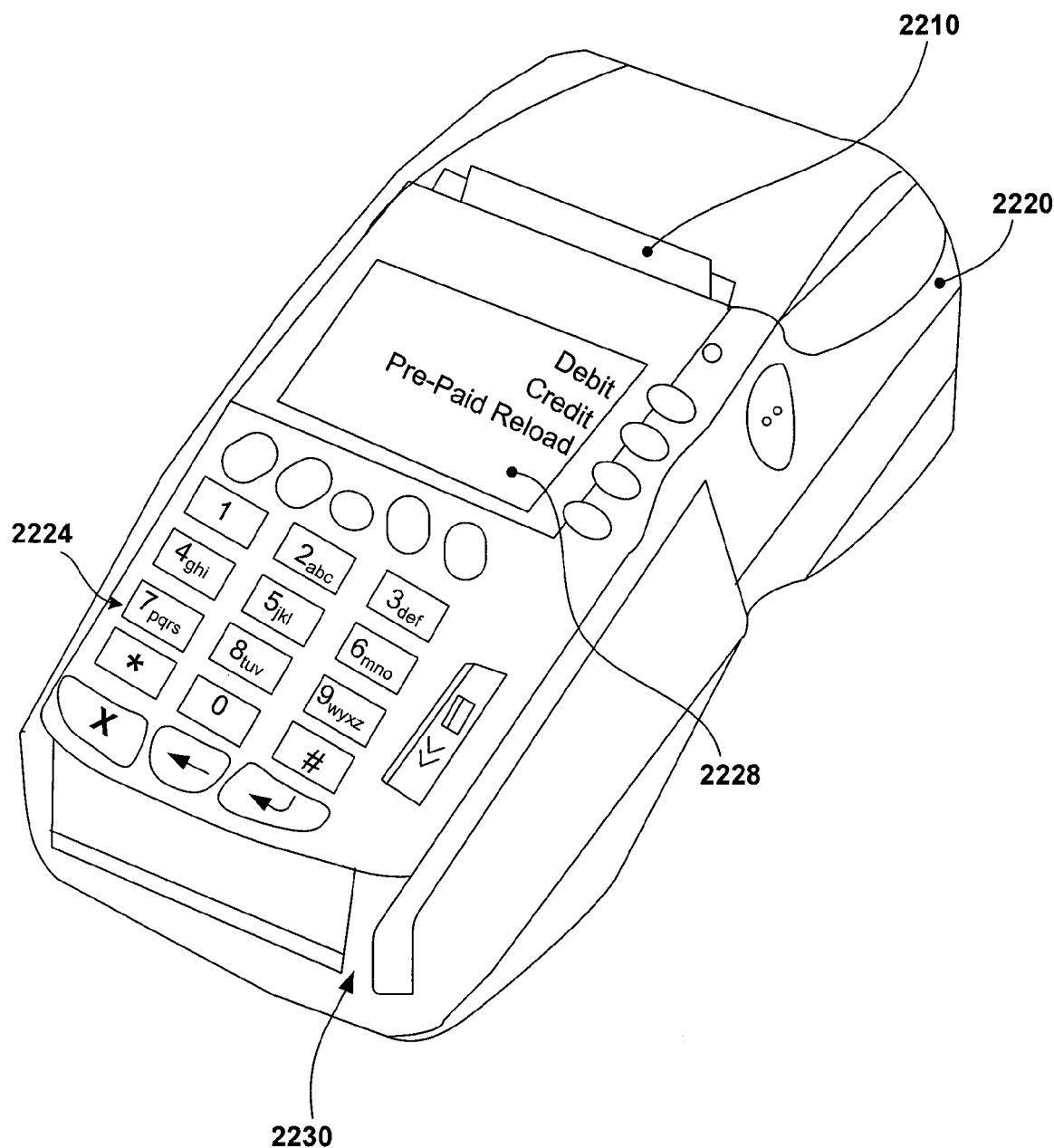
FIG. 22 depicts a physical embodiment of a client terminal included within the system of FIG. 20.

FIG. 22 depicts a physical embodiment of the client terminals 2006$_{a-d}$, which may be positioned at a typical checkout counter of a store, such as a convenience store. Each client terminal 2006$_{a-d}$ is operative to vend a receipt 2210 corresponding to a prepaid telephone or cellular telephone card, prepaid gasoline card, or any other product or service premised upon dispensing of a PIN to a user. The terminal 2006$_{a-d}$ is contained within a housing 2220 that encloses a magnetic stripe reader, an integrated printer unit for printing receipt 2210, a processor, memory and communication circuitry (see FIG. 23). The housing 2220 defines an upper surface upon which is disposed an electronic key pad 2224 for receiving user input and a digital LCD display screen 2228. The housing 2220 further defines a card slot 2230 through which a credit, debit or other card (not shown) may pass so that its magnetic stripe is read by the magnetic stripe reader of the terminal 2006$_{a-d}$.

During operation of the terminal 2006a-d, various options appear on the screen 2228, which a customer may select by pressing an appropriate button on the key pad 2224. A customer may make payment by paying cash to a store clerk, or by swiping a credit, debit or other payment card through card slot 2230.

Figure 23:
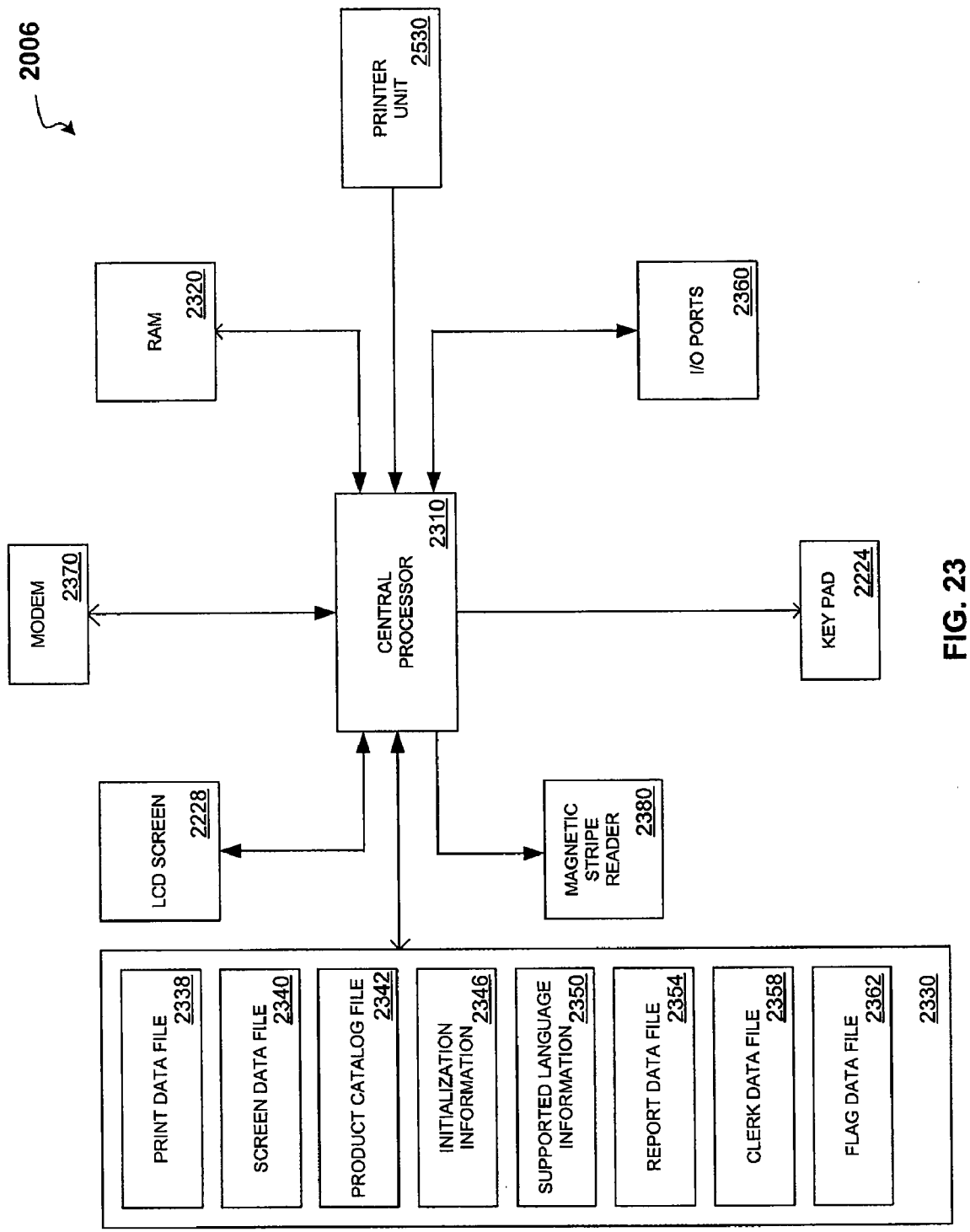
FIG. 23 there shows a block diagrammatic representation of the electronic and other components of an embodiment of the client terminal.

Turning now FIG. 23, there is shown a block diagrammatic representation of the electronic and other components of an embodiment of the client terminal 2006a-d. As shown, the terminal 2006$_{a-d}$ includes a central processor 2310 which may be realized as a 32-bit microprocessor. The terminal 2006$_{a-d}$ further includes RAM 2320 and ROM 2330 coupled to the processor 2310. The processor 2310 is also coupled to a number of other components, including an integrated printer unit 2350, I/O ports 2360, a modem 2370, key pad 2224, digital LCD screen 2228 and magnetic stripe reader 2380. As shown, the ROM 2330 stores instructions of a terminal application program 2334 and other data files described below. Except to the extent the components of the client terminal 2006$_{a-d}$ depicted in FIG. 23 are operating under the control of the application program 2334 in accordance with the invention, such components may function together so as to yield operation analogous to that occurring in conventional point-of-sale terminals, such as the Omni 3700 family of terminals available from Verifone.

As shown in FIG. 23, the ROM 2330 also stores print data file 2338, screen data file 2340, a product catalog file 2342, initialization information 2346, supported language information 2350, report data file 2354, clerk data file 2358 and flag data file 2362. As is discussed hereinafter, the print data file 2338 includes a set of receipt templates downloaded from the receipt template repository 2126 of server 2002 for each product capable of being sold by a given client terminal 2006$_{a-d}$. This contrasts with the current industry practice, which contemplates using a hard-coded format associated with each application running on the terminal. The present invention advantageously permits the receipt templates within the print data file 2338 to be added or changed without changing the code of the application program 2334. Although the software code comprising the application program 2334 will generally be different for different types of client terminals 2006$_{a-d}$, each client terminal 2006$_{a-d}$ may obtain the appropriate type of receipt template from the receipt template repository 2126 in accordance with its terminal type. For example, even if a pair of client terminals 2006$_{a-d}$ are configured with different operating systems or are manufactured by different entities, to the extent the terminals share a common printer width (e.g., 42 characters wide) and preferred language, identical receipt templates are downloaded to these terminals 2006$_{a-d}$ from the receipt template repository 2126.

In addition to using the template mechanism described above in connection with receipt printing, each terminal 2006$_{a-d}$ is also disposed to use a dynamic template mechanism when displaying menus and prompts on its screen 2228. For example, current practice in the credit/debit card industry contemplates developing two versions of the application program executed by a terminal for use in bi-lingual markets; that is, one version of the application program uses prompts in a first language while the other version of the application program employs prompts composed in the second language. Further, if it becomes necessary to change a prompt or menu, a new version of the program must be installed on the conventional terminal. In contrast, the application program 2334 will generally not contain any menus or screen prompts. Instead, user interface templates are retrieved from the screen template repository 2128 by a terminal 2006$_{a-d}$ based upon the physical characteristics of its screen 2228 and the relevant market (e.g., "a 4-line terminal deployed in a Spanish-language market").

Referring again to FIG. 23, the initialization information 2346 specific to a given terminal 2006$_{a-d}$ includes a database code (e.g., two alphanumeric characters), a terminal "login name" (e.g., a string of digits), a terminal password (also digits), and zero or more clerk pass codes for each clerk tracked by the server 2002 (also digits). All of the initialization information 2346 will typically be requested from the user of the terminal 2006$_{a-d}$ during its initial use, and passwords requested during each subsequent use.

The supported language information 2350 generally consists of a short list of languages supported by the applicable terminal 2006$_{a-d}$.

The report data file 2354 typically provides a list of all the reports supported by the server 2002, each of which is identified by a unique number.

The screen data file 2340 generally comprises a collection of template records identified by integer indexes into the file. If a terminal 2006$a$-$d$ supports multiple languages, it will typically include a different screen data file 2340 for each language supported. Each such file will typically include a set of template records corresponding to the applicable language.

The print data file 2338 comprises a collection of template records, each of which is identified by a short string. In one embodiment all items printed by a terminal 2006$a$-$d$ and all items identified by the server 2002 as corresponding to information to be shown on its screen 2228 (e.g., error messages) are included within the print data file 2338. If a terminal 2006$_{a-d}$ supports multiple languages, it will typically include a different print data file 2338 for each language supported. This print data file 2338 also contains all the templates for reports and receipts 2210 generated by the terminal 2006$_{a-d}$, including terms and conditions, rates, the name and address of the store in which the terminal 2006$_{a-d}$ is located, and so on.

The clerk data file 2358 includes a listing of each clerk, along with his or her name and permissions and pass code, authorized to operate the applicable terminal 2006$a$-$d$.

The product catalog 2342 contains the set of prepaid or other products and services available for purchase using the terminal 2006$a$-$d$. Each record within the product catalog 2342 includes an identifying number to be keyed in via key pad 2224 to select the applicable product, and the internal identifier to be requested from the server 2002 when the product is selected. When the product being sold comprises prepaid telecommunications services (i.e., a "prepaid phone card"), the record specifies the denomination of the card, the associated carrier and region, and similar details.

Finally, the flag data 2362 consists of a collection of "flags" that control operation of the terminal 2006$a$-$d$. These flags are stored into a keyed file during download from the server 2002, modified during execution, and later used to control the behavior of the terminal 2006$a$-$d$. Various ones of these flags may indicate whether the various files described above are currently valid, when the terminal 2006$a$-$d$ should again check for a new download from the server 2002, whether a user operating the terminal 2006$a$-$d$ requires a clerk pass code to make sales, and so on.

Figure 24:
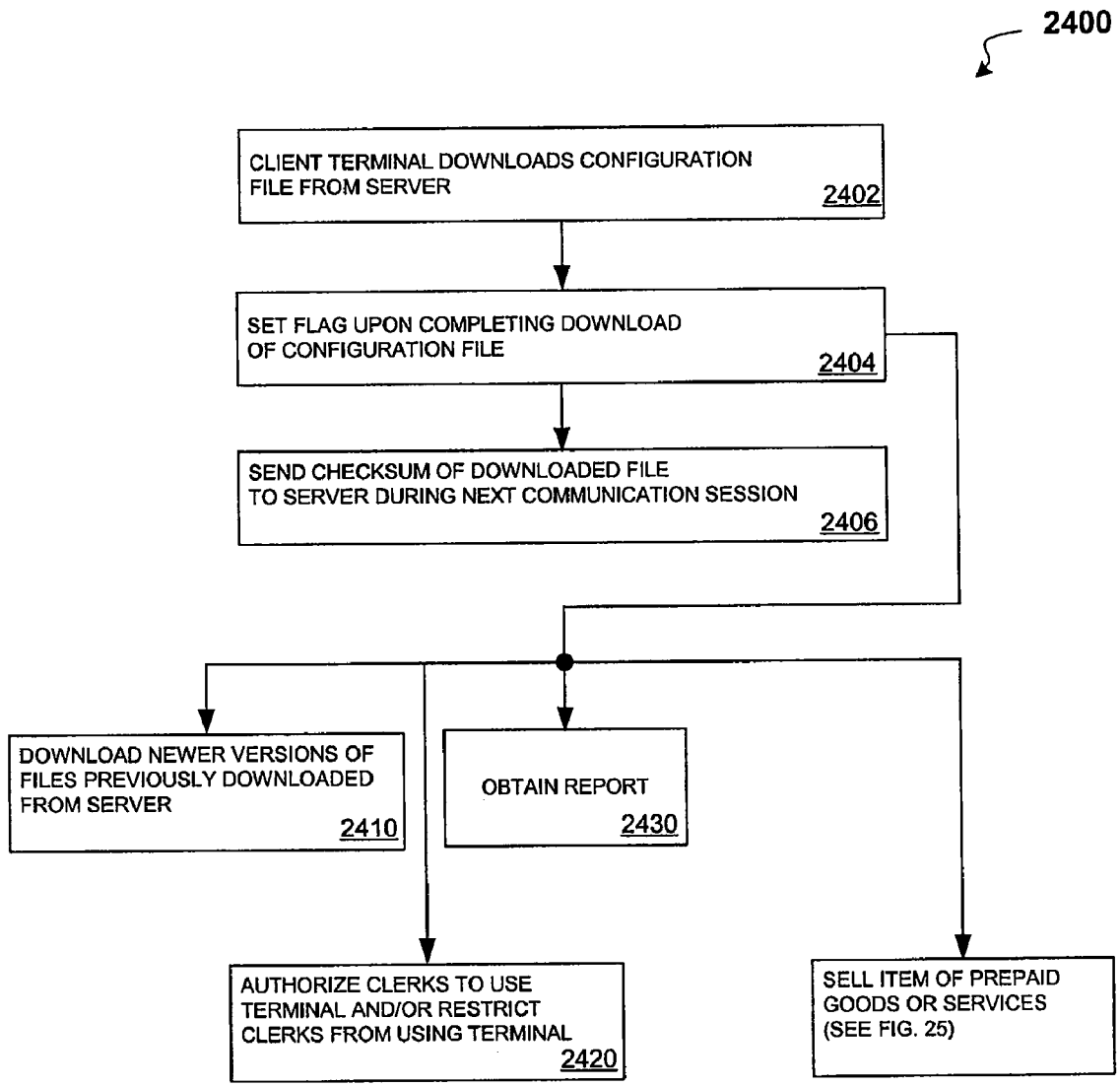
FIG. 24 is a flowchart depicting steps carried out in connection with configuring a client terminal and performing various operations in accordance with the invention.

Referring next to FIG. 24, shown is a flowchart 2400 depicting steps carried out in connection with configuring a client terminal 2006$_{a-d}$ and performing various operations in accordance with the invention. Upon being connected to the network 2004, a client terminal 2006$_{a-d}$ establishes communication with the server 2002 and downloads a configuration file (step 2402). Stored within this configuration file is a Terminal Download Files Valid (TDFV) flag. If this flag is not set (or is set to zero), the application program 2334 accesses the screen data file 2340 and prompts for the login information described above. Once this login information has been entered via key pad 2224, the application program 2334 instructs modem 2370 to contact the server and download a new product catalog file 2342. The last line of the download containing this product catalog file 2342 sets the TDFV flag, which occurs immediately following receipt at the terminal 2006$_{a-d}$ of the database code, terminal login name, and terminal password (step 2404). Since a download can take several minutes, the downloaded file also contains its checksum, which is transmitted to the server 2002 during the next communication session between the terminal 2006$_{a-d}$ and the server 2002 (step 2406). Since the server 2002 will also have a record of this checksum, the server is able to determine when the product catalog file 2342 or other information at the client terminal 2006$_{a-d}$ is out of date and only then will indicate to the client terminal 2006$_{a-d}$ that a new product catalog file 2342 should be downloaded.

Once the initial set of files downloaded to the client terminal 2006$a$-$d$ have been determined to be valid (i.e., the TDFV flag has been set), a user may command the terminal 2006$a$-$d$ to perform any of four operations.

A first operation which may be selected is to is download newer versions of the files previously downloaded from the server (step 2410). As was mentioned above, this operation will typically be performed when parameters or other information maintained by the server 2002 has changed (e.g., clerks have been removed or new products have been added). In this case the checksum transmitted by the client terminal 2006$_{a-d}$ upon beginning a new communication session with the server 2002 following such a change will not match the checksum at the server 2002, and a flag is set indicating that the client terminal 2006$_{a-d}$ should prompt its user via screen 2228 to initiate a download from the server 2002. If the checksum from the client terminal 2006$_{a-d}$ matches the corresponding checksum most recently computed at the server 2002, then the previously downloaded files are simply marked as "good" at the client terminal 2006$_{a-d}$. In one embodiment the checksum provided by the client terminal 2006$_{a-d}$ is stored at the server 2002 and occasionally compared, during transactions involving the client terminal $2006_{a\text{-}d}$, to the corresponding checksum most recently computed at the server 2002.

A second operation which may be performed permits a manager or other supervisory personnel to authorize or restrict one or more clerks from using the client terminal $2006_{a\text{-}d}$ (step 2420). When the manager selects the option to so disable a clerk's login privileges, the application program 2334 accesses the screen data file 2340 and issues a prompt via its screen 2228 for the manager's pass code and the clerk's pass code. The application program 2334 then instructs the modem 2370 to establish communication with the server 2002, and submits the transaction disabling the clerk over the communication channel established with the server 2002. The client terminal $2006_{a\text{-}d}$ then receives a "yes" or "no" response from the server 2002. If a "yes" response is received, the application program 2334 marks the clerk as disabled; otherwise, it does not. When the option to add a clerk is selected, the application program 2334 accesses the screen data file 2340 and issues a prompt via its screen 2228 for the manager's code, the new clerk's code, and the new clerk's name. This information is then submitted to the server 2002 in the manner described above, and a "yes" or "no" response is again received. If a "yes" response is received, the application program 2334 adds the new clerk to a list of authorized clerks; otherwise, the new clerk is not added to this list.

A third option which may be selected is to obtain a report (step 2430). A user of this operation initiates processing by selecting via key pad 2224 the type of report desired from among those listed on the screen 2228. The selected report is marked in the report data file 2354 with the privileges needed to invoke the report and the other parameters needed to generate the report. For example, a "list all clerks" report requires a manager's pass code, while an "end of day summary" report requires input of a starting and ending time via key pad 2224. Once the parameters required to generate the report have been received from the user via key pad 2224, they are sent to the server 2002. In reply, the server 2002 transmits one or more records to the terminal $2006_{a\text{-}d}$. Each reply record specifies an identifier in the print data file 2338, and some number of strings to be substituted into the template so identified. In the exemplary embodiment the information corresponding to each reply record is simply printed by the terminal $2006_{a\text{-}d}$ upon a receipt 2210 in the manner dictated by the applicable template without processing or otherwise interpreting the information.

Figure 25:
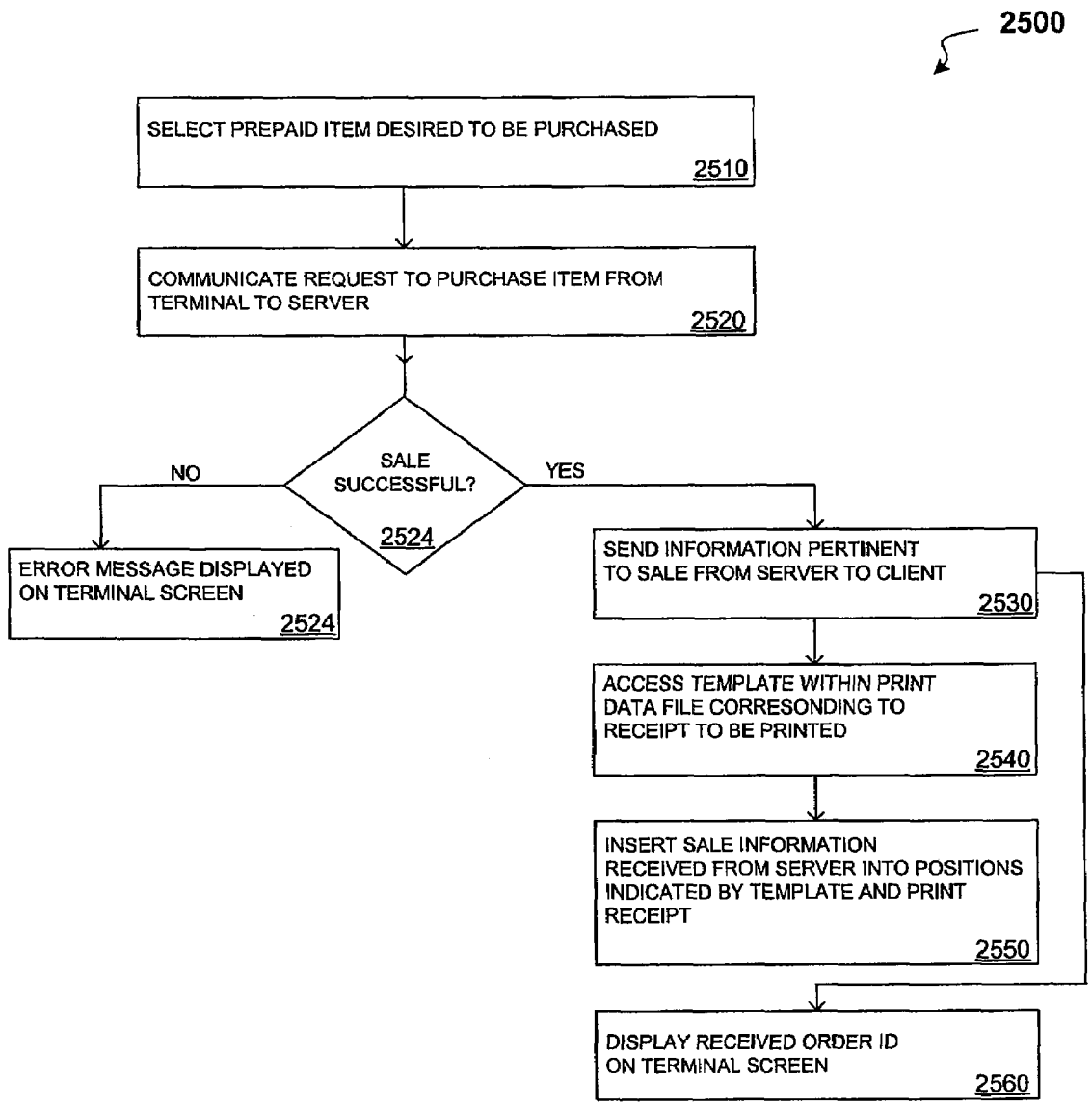
FIG. 25 provides a flowchart that illustrates the steps involved in selling an item of prepaid goods or services in a manner consistent with the invention.

Turning now to FIG. 25, a flowchart 2500 is provided of the steps involved in performing a fourth operation which may be selected; specifically, sale of an item of prepaid goods or services. This operation is initiated when a clerk using the terminal $2006_{a\text{-}d}$ selects or otherwise identifies an item desired to be purchased by a customer (step 2510). In this regard the clerk may enter either a shopkeeping unit (SKU) code corresponding to the desired item from the product catalog file 2342 (e.g., 12345 for $100 of telecommunications service from Verizon), or may instead scroll through a list of available products rendered on the screen 2228. A request to purchase the selected item is then communicated from the terminal $2006_{a\text{-}d}$ to the server 2002 (step 2520). If the sale is successful (step 2524), the server 2002 returns various information pertinent to the sale (e.g., PIN number, transaction ID, access phone number to be dialed in order to use the purchased value associated with the PIN, and so on) (step 2530). The server 2002 also returns an Order ID, which identifies the transaction in question and permits the user of the terminal $2006_{a\text{-}d}$ to contact the operator of the server 2002 and obtain the above sale information should the receipt 2210 fail to print for some reason. Once the sale information and Order ID have been received, the modem 2370 of the terminal $2006_{a\text{-}d}$ terminates the connection with the server 2002 and the application program 2346 accesses the template within the print data file 2338 corresponding to the receipt 2210 to be printed (step 2540). The sale information received from the server 2002 is inserted into the appropriate positions as indicated by the template, and a corresponding receipt 2210 is printed (step 2550). In addition, received Order ID is displayed on the screen 2228 (step 2560).

If the sale is unsuccessful (step 2524), a receipt 2210 is not printed and an error message is displayed upon the screen 2228 (step 2570). For example, the screen 2228 may display a reason that the sale was unsuccessful, followed by the message "Sale Cancelled". In the exemplary embodiment the terminal 2006a-d does not retain any information relating to either a successful or unsuccessful sale, and neither are any totals or settlement files maintained at the terminal 2006a-d.

In exemplary embodiments each terminal 2006a-d communicates with the server 2002 in accordance with a half-duplex line protocol in which each transmitted message packet contains a variable length ASCII string. Upon initiation of a transaction, the terminal 2006a-d or server 2002 dials the other entity and awaits an enqueue (ENQ). Upon receiving the ENQ from the receiving entity, the transmitting entity begins transmitting message packets. In this regard the protocol contemplates that each message begins with a start of text (STX) control character, which precedes a variable-length text block or "protocol data unit" (PDU). The PDU is followed by an end of text (ETX) control character, which is in turn followed by an error checking byte. In the exemplary embodiment this error checking byte comprises a longitudinal redundancy check (LRC) error check byte, which is obtained by computing the exclusive-or of all the data within the message packet (not including the STX and ETX). The entity receiving the message packet also performs an exclusive-or on the data in the PDU as well as on the LRC error check. The result will be equal to zero if the packet has been transmitted successfully from the terminal $2006_{a\text{-}d}$ to the server 2002, or vice versa. The receiving entity responds with an ACK if the message was received properly, and will respond with a NAK if there are any framing, LRC or other errors. If an ACK is received, then the transmitting entity continues transmitting any message packets remaining to be transmitted. If instead a NAK is received by the transmitting entity, then the message is re-transmitted.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description, not limitation. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following Claims and their equivalents define the scope of the invention.

What is claimed is:

1. A method of obtaining a personal identification number (PIN) from a client terminal, comprising:

storing, at the client terminal, a plurality of receipt templates for plural prepaid services provided by a plurality of prepaid service providers wherein the receipt templates are received from a server and one or more of the receipt templates include a PIN field;

receiving, at the client terminal, a request for a PIN associated with a first of the plural prepaid services from a first of the plural prepaid service providers; and printing a requested PIN and other information associated with the first of the plural prepaid services upon a receipt dispensed by the client terminal in accordance with a first of the receipt templates associated with the first of the plural prepaid services.

2. The method of claim 1 further including:

sending, from the client terminal, a PIN request to the server in response to the request for a PIN; and receiving, at the client terminal, the requested PIN.

3. The method of claim 1 further including dispensing an additional requested PIN from the client terminal by printing an additional receipt wherein additional information is printed upon the additional receipt in accordance with a second of the receipt templates associated with a second of the prepaid services provided by a second of the prepaid service providers.

4. The method of claim 1 further including receiving and storing, at the client terminal, a product catalog containing information identifying one or more of the plural prepaid services.

5. The method of claim 4 further including displaying, upon a screen of the client terminal, prompts relating to information required to be provided in connection with purchase of one of the plural prepaid services, wherein the prompts are stored within the product catalog.

6. The method of claim 1 further including receiving, at the client terminal, at least certain of the other information provided by the server; and displaying, upon a screen of the client terminal, at least a portion of the other information.

7. The method of claim 1 further including:

storing, at the client terminal, a plurality of report templates associated with the plurality of prepaid service providers; and printing, at the client terminal and in accordance with one of the report templates, a report pertaining to operation of the client terminal.

8. The method of claim 1 further including:

receiving, at the client terminal, a configuration file downloaded from the server wherein the configuration file includes one or more receipt templates from one or more of the plural prepaid service providers;

storing a checksum for the configuration file at the client terminal upon completion of downloading of the configuration file;

communicating the checksum to the server;

comparing the checksum to a configuration checksum maintained at the server; and transmitting, from the server to the client terminal, an updated configuration file when the checksum does not sufficiently match the configuration checksum.

9. The method of claim 1 further including:

downloading, from the server to the client terminal, one or more user interface templates corresponding to a type of the client terminal; and displaying information on a screen of the client terminal in a manner consistent with one or more of the user interface templates.

10. A client terminal, comprising:

a processor;

memory operatively coupled to the processor, the memory storing receipt templates for plural prepaid services provided by a plurality of prepaid service providers wherein the receipt templates are received from a server and one or more of the receipt templates include a PIN field;

a user interface configured to receive a request for a PIN associated with a first of the plural prepaid services provided by a first of the plural prepaid service providers; and a dispensing mechanism for printing, in accordance with a first of the receipt templates associated with the first of the plural prepaid services, a receipt containing a requested PIN and other information associated with the first of the plural prepaid services.

11. The client terminal of claim 10 further including a network interface through which is transmitted, to the server, a PIN request generated in response to the request for a PIN and through which is received the requested PIN.

12. The client terminal of claim 10 wherein the dispensing mechanism is further configured to print, in accordance with a second of the receipt templates associated with a second of the plural prepaid services provided by a second of the prepaid service providers, an additional receipt containing an additional requested PIN and other information associated with the second of the plural prepaid services.

13. The client terminal of claim 10 wherein an identifier corresponding to the first of the receipt templates is received from the server through the network interface.

14. The client terminal of claim 10 wherein at least certain of the other information is provided by the server and received by the client terminal through the network interface.

15. The client terminal of claim 10 wherein the memory further stores a product catalog received from the server through the network interface, the product catalog containing information identifying at least a portion of the plural prepaid services.

16. The client terminal of claim 15 wherein the user interface is further operative to display prompts relating to information required to be provided in connection with purchase of one of the plural prepaid services wherein textual information relating to the prompts is stored within the product catalog.

17. The client terminal of claim 10 wherein the memory further includes user interface templates corresponding to a type of the client terminal, said user interface templates being downloaded from the server to the client terminal.

18. The client terminal of claim 17 wherein the user interface is operative to present display information in a manner consistent with one or more of the user interface templates.

19. A PIN delivery system comprising:

a plurality of client terminals configured to receive information from a plurality of prepaid service providers wherein at least a first client terminal included within the plurality of client terminals is of a first terminal type and wherein at least a second client terminal included within the plurality of client terminals is of a second terminal type, said first client terminal containing a first client terminal processor and first client terminal memory operatively coupled to said first client terminal processor and said second client terminal containing a second client terminal processor and second client terminal memory operatively coupled to said second client terminal processor;

a server containing a server processor and server memory operatively coupled to the server processor; and a database in communication with the server, the database containing:

a plurality of sets of PINs associated with a corresponding plurality of prepaid services provided by the plurality of prepaid service providers;

a first set of receipt templates, including one or more templates from each of a plurality of the plurality of service providers, disposed to be utilized by ones of the client terminals of said first terminal type wherein at least one of said receipt templates in one of said first set of receipt templates includes a PIN field;

a second set of receipt templates, including one or more templates from each of a plurality of the plurality of service providers, disposed to be utilized by ones of the client terminals of said second terminal type server wherein at least one of said receipt templates in one of said second set of receipt templates includes a PIN field;

wherein the server processor executes instructions stored in the server memory for:

sending, to the first client terminal, the first set of receipt templates and at least a first PIN included within the plurality of sets of PINs; and sending, to the second client terminal, the second set of receipt templates and at least a second PIN included within the plurality of sets of PINs, and wherein the first client terminal processor executes instructions stored in the first client terminal memory for:

receiving and storing the first set of receipt templates and receiving at least a first PIN included within the plurality of sets of PINs, and wherein the second client terminal processor executes instructions stored in the second client terminal memory for:

receiving and storing the second set of receipt templates and receiving at least a second PIN included within the plurality of sets of PINs.

20. The PIN delivery system of claim 19 wherein each receipt template of the first set of receipt templates corresponds to one of the plurality of prepaid services provided by the plurality of prepaid service providers and wherein each receipt template of the second set of receipt templates corresponds to one of the plurality of prepaid services provided by the plurality of prepaid service providers.

21. The PIN delivery system of claim 19 wherein the first client terminal includes a first dispensing mechanism through which is dispensed a first receipt upon which is printed the first PIN, the receipt further including other information printed in accordance with a first receipt template of the first set of receipt templates wherein the first PIN and the first receipt template are associated with a first of the plurality of prepaid services provided by a first of the plurality of prepaid service providers.

22. The PIN delivery system of claim 21 wherein the second client terminal includes a second dispensing mechanism through which is dispensed a second receipt upon which is printed the second PIN, the receipt further including additional information printed in accordance with a second receipt template of the second set of receipt templates wherein the second PIN and the second receipt template are associated with a second of the plurality of prepaid services provided by a second of the plurality of prepaid service providers.

23. The PIN delivery system of claim 21 wherein the database further contains:

a first set of report templates disposed to be utilized by ones of the client terminals of said first terminal type;

a first set of user interface templates disposed to be utilized by ones of the client terminals of said first terminal type;

a second set of report templates disposed to be utilized by ones of the client terminals of said second terminal type; and a second set of user interface templates disposed to be utilized by ones of the client terminals of said second terminal type.

24. The PIN delivery system of claim 23 wherein the server processor executes additional instructions stored in the server memory for:

sending, to the first client terminal, the first set of report templates;

sending, to the second client terminal, the second set of report templates;

sending, to the first client terminal, the first set of user interface templates; and sending, to the second client terminal, the second set of user interface templates.

25. A client terminal configured to assist in processing plural prepaid services comprising:

an input device;

a display;

a processor; and a processor readable memory configured to store data and one or more computer programs having instructions configured to be executed on said processor, said instructions configured to:

receive, from a server, a plurality of templates associated with a plurality of prepaid services provided by a plurality of prepaid service providers, at least one of said plurality of templates including a PIN field;

store said plurality of templates in said memory;

receive, at said input device, a user request for a first prepaid service associated with the plurality of prepaid service providers;

display, at said display device, information related to said user request;

determine, based at least in part on said user request, availability of the requested prepaid service; and based on said determining, provide, in accordance with one or more of said plurality of templates, a PIN for use of said prepaid services if the requested prepaid service is available.

\* \* \* \* \*